(12) United States Patent
Dani et al.

(10) Patent No.: US 11,273,625 B2
(45) Date of Patent: Mar. 15, 2022

(54) PROCESS FOR MANUFACTURING MULTI-LAYER SUBSTRATES COMPRISING SANDWICH LAYERS AND POLYETHYLENE

(71) Applicant: The Clorox Company, Oakland, CA (US)

(72) Inventors: Nikhil P. Dani, Pleasanton, CA (US); Joerg Hendrix, Kennesaw, GA (US); Scott Wood, Pleasanton, CA (US); Hubert Chan, Pleasanton, CA (US); Mark Pszczolkowski, Pleasanton, CA (US); Daniela Fritter, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 252 days.

(21) Appl. No.: 16/710,857

(22) Filed: Dec. 11, 2019

(65) Prior Publication Data

US 2020/0199824 A1    Jun. 25, 2020

Related U.S. Application Data

(60) Provisional application No. 62/860,655, filed on Jun. 12, 2019, provisional application No. 62/828,301, (Continued)

(51) Int. Cl.
*B32B 23/02* (2006.01)
*B32B 5/02* (2006.01)
(Continued)

(52) U.S. Cl.
CPC .............. *B32B 23/02* (2013.01); *B08B 1/006* (2013.01); *B32B 5/022* (2013.01); *B32B 7/12* (2013.01);
(Continued)

(58) Field of Classification Search
CPC ....... D21F 11/006; D21F 11/14; D21H 13/14; D21H 27/002; D21H 27/02; D21H 27/36;
(Continued)

(56) References Cited

U.S. PATENT DOCUMENTS

| 2,684,924 A | 7/1954 | Leslie et al. |
| 2,990,425 A | 6/1961 | Norman |

(Continued)

FOREIGN PATENT DOCUMENTS

| CA | 2132274 | 9/1994 |
| DE | 2212259 | 10/1972 |

(Continued)

OTHER PUBLICATIONS

International Search Report, dated Jul. 29, 2013, from counterpart PCT/US13/48586; dated Jun. 28, 2013.

*Primary Examiner* — Jose A Fortuna
(74) *Attorney, Agent, or Firm* — Workman Nydegger

(57) ABSTRACT

Methods for forming multi-layer substrates including top and bottom surface layers and a melt softened thermoplastic material layer between the exterior surface layers, where the thermoplastic material includes polyethylene or has a tan delta value of 0.2 to 0.4 within the temperature range of 100° F.–350° F. The 3 (or more) layers are assembled, and heated, melt softening the thermoplastic material, causing bonding of the thermoplastic layer to the exterior surface layers. A cleaning composition may be loaded onto the multi-layer substrate, where a fluid pathway through the melted thermoplastic material allows the cleaning composition to travel between the surface layers. Adhesion between the surface layers and the thermoplastic layer is provided by the thermoplastic material itself, which bonds to groups of fibers in the surface layers. The process does not require chemical (Continued)

adhesives, any processing water, drying, or the like, so as to be possible with low capital investment.

19 Claims, 16 Drawing Sheets

Related U.S. Application Data filed on Apr. 2, 2019, provisional application No. 62/784,274, filed on Dec. 21, 2018.

(51) Int. Cl.

| | | |
|---|---|---|
| *B32B 27/32* | (2006.01) | |
| *B32B 27/12* | (2006.01) | |
| *B08B 1/00* | (2006.01) | |
| *B32B 27/10* | (2006.01) | |
| *B32B 29/00* | (2006.01) | |
| *D21H 13/14* | (2006.01) | |
| *D21H 27/00* | (2006.01) | |
| *D21H 27/02* | (2006.01) | |
| *D21H 27/36* | (2006.01) | |
| *A47L 13/17* | (2006.01) | |
| *C11D 17/04* | (2006.01) | |
| *C11D 3/30* | (2006.01) | |
| *B32B 7/12* | (2006.01) | |
| *D21F 11/00* | (2006.01) | |
| *D21F 11/14* | (2006.01) | |

(52) U.S. Cl.
CPC .............. *B32B 27/10* (2013.01); *B32B 27/12* (2013.01); *B32B 27/32* (2013.01); *B32B 29/002* (2013.01); *C11D 3/30* (2013.01); *C11D 17/041* (2013.01); *D21F 11/006* (2013.01); *D21F 11/14* (2013.01); *D21H 13/14* (2013.01); *D21H 27/002* (2013.01); *D21H 27/02* (2013.01); *D21H 27/36* (2013.01); *A47L 13/17* (2013.01); *B32B 2250/03* (2013.01); *B32B 2250/40* (2013.01); *B32B 2260/04* (2013.01); *B32B 2262/062* (2013.01); *B32B 2274/00* (2013.01); *B32B 2307/724* (2013.01); *B32B 2307/728* (2013.01); *B32B 2367/00* (2013.01); *B32B 2432/00* (2013.01); *Y10T 428/3188* (2015.04); *Y10T 428/31855* (2015.04)

(58) Field of Classification Search
CPC ........ D21H 25/04; D21H 25/06; D21H 27/30; D21H 27/32; D21H 27/34; B32B 23/02; B32B 5/022; B32B 7/12; B32B 27/10; B32B 27/12; B32B 27/32; B32B 29/002; B32B 2250/03; B32B 2250/40; B32B 2260/04; B32B 2262/062; B32B 2274/00; B32B 2307/724; B32B 2307/738; B32B 2367/00; B32B 2432/00; B32B 2262/023; B32B 2262/0238; B32B 2262/0284; B32B 2262/067; B32B 5/08; B32B 5/26; B32B 2262/0246; B32B 2262/0253; B32B 2262/0261; B32B 2262/065; B32B 2262/14; B32B 2307/412; B32B 2307/414; B32B 2307/718; B32B 2307/726; B32B 2307/732; B32B 5/024; Y10T 428/31855; Y10T 428/3188; A47L 13/17; A47L 13/51; C11D 3/30; C11D 17/041; B08B 1/006
See application file for complete search history.

(56) References Cited

U.S. PATENT DOCUMENTS

| | | |
|---|---|---|
| 3,468,898 A | 9/1969 | Cutler et al. |
| 4,022,834 A | 5/1977 | Gundersen |
| 4,053,636 A | 10/1977 | Eustis et al. |
| 4,198,392 A | 4/1980 | Juneja |
| 4,463,045 A | 7/1984 | Ahr et al. |
| 4,540,505 A | 9/1985 | Frazier |
| 5,145,604 A | 9/1992 | Neumiller |
| 5,246,772 A | 9/1993 | Manning |
| 5,292,581 A | 3/1994 | Viazmensky et al. |
| 5,342,534 A | 8/1994 | Skrobala et al. |
| 5,444,094 A | 8/1995 | Malik et al. |
| 5,454,984 A | 10/1995 | Graubart et al. |
| 5,459,912 A | 10/1995 | Oathout |
| 5,522,942 A | 6/1996 | Graubart et al. |
| 5,686,015 A | 11/1997 | Willey et al. |
| 5,798,329 A | 8/1998 | Taylor et al. |
| 5,814,591 A | 9/1998 | Mills et al. |
| 5,908,854 A | 6/1999 | McCue et al. |
| 5,922,665 A | 7/1999 | Liu |
| 5,948,743 A | 9/1999 | Fonsny et al. |
| 6,017,869 A | 1/2000 | Lu et al. |
| 6,080,706 A | 6/2000 | Blanvalet et al. |
| 6,090,768 A | 7/2000 | Delaney et al. |
| 6,110,295 A | 8/2000 | Lu et al. |
| 6,121,224 A | 9/2000 | Fonsny et al. |
| 6,130,197 A | 10/2000 | Bedrod et al. |
| 6,143,244 A | 11/2000 | Xia et al. |
| 6,143,281 A | 11/2000 | Alexander et al. |
| 6,153,568 A | 11/2000 | McCanna et al. |
| 6,187,737 B1 | 2/2001 | Geke et al. |
| 6,277,805 B1 | 8/2001 | Kupneski |
| 6,323,171 B1 | 11/2001 | Fonsny et al. |
| 6,339,057 B1 | 1/2002 | Knox et al. |
| 6,342,474 B1 | 1/2002 | Kerobo et al. |
| 6,358,900 B1 | 3/2002 | Wigley et al. |
| 6,368,609 B1 | 4/2002 | Fontenot et al. |
| 6,376,455 B1 | 4/2002 | Friedli et al. |
| 6,387,855 B1 | 5/2002 | de la Mettrie |
| 6,387,866 B1 | 5/2002 | Mondin et al. |
| 6,387,871 B2 | 5/2002 | Faber |
| 6,429,183 B1 | 8/2002 | Leonard et al. |
| 6,462,014 B1 | 10/2002 | Johnson et al. |
| 6,583,104 B1 | 6/2003 | Christensen et al. |
| 6,589,892 B1 | 7/2003 | Smith et al. |
| 6,596,681 B1 | 7/2003 | Mahieu et al. |
| 6,680,264 B2 | 1/2004 | Julemont |
| 6,693,070 B1 | 2/2004 | Cheung et al. |
| 6,737,068 B2 | 5/2004 | Durden |
| 6,814,088 B2 | 11/2004 | Barnabas et al. |
| 6,831,050 B2 | 12/2004 | Murch et al. |
| 6,844,308 B1 | 1/2005 | Dastbaz et al. |
| 6,849,589 B2 | 2/2005 | Liu |
| 6,936,580 B2 | 8/2005 | Sherry et al. |
| 7,071,155 B2 | 7/2006 | Griese et al. |
| 7,214,651 B2 | 5/2007 | Mohr et al. |
| 7,348,303 B2 | 3/2008 | Gallotti et al. |
| 7,396,808 B1 | 7/2008 | Hood et al. |
| 7,414,017 B2 | 8/2008 | Kong et al. |
| 7,465,684 B2 | 12/2008 | Hurley et al. |
| 7,511,006 B2 | 3/2009 | Shimmin et al. |
| 7,530,361 B2 | 5/2009 | Killeen et al. |
| 7,550,416 B2 | 6/2009 | Woo et al. |
| 7,696,109 B2 | 4/2010 | Ouellette et al. |
| 7,732,357 B2 | 6/2010 | Annis et al. |
| 8,118,177 B2 | 2/2012 | Drapela et al. |
| 8,173,146 B2 | 5/2012 | Leroy |
| 8,252,819 B2 | 8/2012 | Felder et al. |
| 8,278,260 B2 | 10/2012 | Victor |
| 8,283,304 B2 | 10/2012 | Victor |
| 8,603,622 B2 | 12/2013 | Roettger et al. |
| 8,648,027 B2 | 2/2014 | Mitchell et al. |
| 9,005,738 B2 | 4/2015 | Baker et al. |
| 9,006,165 B2 | 4/2015 | Mitchell et al. |
| 9,138,943 B2 | 9/2015 | Weinberg et al. |
| 9,234,165 B2 | 1/2016 | Hope et al. |

(56) References Cited

U.S. PATENT DOCUMENTS

| | | |
|---|---|---|
| 9,826,736 B2 | 11/2017 | Napolitano et al. |
| 9,988,594 B2 | 6/2018 | Hope et al. |
| 10,982,177 B2* | 4/2021 | Dani .................... C11D 3/2068 |
| 2002/0148547 A1 | 10/2002 | Abed et al. |
| 2003/0041953 A1 | 3/2003 | Farell et al. |
| 2003/0073600 A1 | 4/2003 | Avery et al. |
| 2003/0228991 A1 | 12/2003 | Johnson et al. |
| 2004/0209792 A1 | 10/2004 | Mitra et al. |
| 2004/0224867 A1 | 11/2004 | Colurciello et al. |
| 2005/0026802 A1 | 2/2005 | Kilkenny et al. |
| 2005/0148655 A1 | 7/2005 | Manzer |
| 2005/0215458 A1 | 9/2005 | Lalum et al. |
| 2005/0227898 A1 | 10/2005 | Leskowicz et al. |
| 2006/0016785 A1 | 1/2006 | Egbe et al. |
| 2006/0052264 A1 | 3/2006 | Lu |
| 2006/0172912 A1 | 8/2006 | Burt et al. |
| 2006/0234899 A1 | 10/2006 | Nekmard et al. |
| 2007/0185004 A1 | 8/2007 | Kilkenny et al. |
| 2008/0261856 A1 | 10/2008 | Nakagawa et al. |
| 2008/0287331 A1 | 11/2008 | Lin et al. |
| 2010/0101605 A1 | 4/2010 | Victor |
| 2010/0160205 A1* | 6/2010 | Ouellette ................ A47L 13/17 510/441 |
| 2010/0249245 A1 | 9/2010 | Whiteley et al. |
| 2010/0323895 A1 | 12/2010 | Garner |
| 2011/0098206 A1 | 4/2011 | Lynch et al. |
| 2011/0211600 A1 | 9/2011 | Dantus et al. |
| 2011/0219312 A1 | 9/2011 | Kim et al. |
| 2011/0311600 A1 | 12/2011 | Polzin et al. |
| 2012/0034287 A1 | 2/2012 | Napolitano et al. |
| 2012/0156461 A1 | 6/2012 | Krishnamurthy |
| 2012/0227203 A1* | 9/2012 | Ouellette ................ A47L 13/16 15/209.1 |
| 2014/0093698 A1 | 4/2014 | Perry et al. |
| 2018/0001591 A1 | 1/2018 | Dutkiewicz |
| 2018/0216044 A1 | 8/2018 | Ojha et al. |
| 2019/0082926 A1* | 3/2019 | Dani ......................... B32B 5/26 |
| 2019/0082927 A1* | 3/2019 | Dani ....................... A47L 13/17 |
| 2019/0085274 A1* | 3/2019 | Dani .................... C11D 3/2068 |
| 2019/0085275 A1* | 3/2019 | Dani .................... C11D 17/049 |
| 2019/0105869 A1* | 4/2019 | Dani ...................... B32B 5/022 |
| 2019/0106820 A1* | 4/2019 | Dani ........................ B32B 7/12 |
| 2020/0040496 A1* | 2/2020 | Dani ...................... B32B 5/024 |
| 2020/0080031 A1* | 3/2020 | Dani .................... C11D 3/2068 |
| 2020/0198288 A1* | 6/2020 | Dani ...................... D21H 25/04 |
| 2020/0198303 A1* | 6/2020 | Dani ...................... D21H 13/14 |
| 2020/0199824 A1* | 6/2020 | Dani ...................... B08B 1/006 |
| 2021/0207068 A1* | 7/2021 | Dani ........................ C11D 3/48 |

FOREIGN PATENT DOCUMENTS

| | | |
|---|---|---|
| DE | 2627548 | 1/1977 |
| DE | 1964196 | 2/1977 |
| EP | 24031 | 5/1987 |
| WO | 9845519 | 10/1998 |
| WO | 200034567 | 6/2000 |
| WO | 200059439 | 10/2000 |
| WO | 200129301 | 4/2001 |
| WO | 02057528 | 7/2002 |
| WO | 2007073877 | 7/2007 |
| WO | 2008008063 | 1/2008 |
| WO | 2010101864 | 9/2010 |
| WO | 2011064554 | 6/2011 |
| WO | 2017123740 | 7/2017 |
| WO | 2018197937 | 11/2018 |

* cited by examiner

PROCESS FOR MANUFACTURING MULTI-LAYER SUBSTRATES COMPRISING SANDWICH LAYERS AND POLYETHYLENE

BACKGROUND OF THE INVENTION

1. The Field of the Invention

The present invention relates to methods for manufacturing cleaning wipes, more particularly to pre-moistened cleaning wipes that are formed from multi-layer substrates.

2. Description of Related Art

Numerous cleaning wipes are available, e.g., such as CLOROX DISINFECTING WIPES. While such wipes provide good overall cleaning and disinfection characteristics, versatility, and convenience, there is a continuing need for improved cleaning wipes, as well as methods for their manufacture.

BRIEF SUMMARY

The present invention relates methods of manufacturing wipes that may typically be pre-moistened during manufacture or use, where the wipe includes a multi-layer substrate comprising at least three layers, where the wipe as a whole may include a significant fraction of pulp fibers, and where such can be achieved in a relatively simple, high speed (350 meter per minute (mpm) or more), low capital investment process, where the process does not employ loose pulp fibers within the process, does not require use of process water to aid in maneuvering fibers (pulp or otherwise present in any of the layers) along the plane of the wipe or through the thickness of the wipe, does not require a drying step to remove such process water, does not require use of chemical binders to achieve bonding between the three layers, and which facilitates use of synthetic fibers (e.g., staple or continuous synthetic fibers) having particular properties, for the middle layer of the multi-layer substrate without the fibers of the middle layer protruding through the external surface of either the top or bottom layers.

An embodiment may be directed to a method for manufacturing a multi-layer substrate, including providing both top and bottom surface layers, e.g., both comprised of pulp fibers, providing a thermoplastic material that comprises polyethylene and/or has a tan delta value of 0.2 to 0.4 within the temperature range of 100° F. to 350° F., positioning the thermoplastic material so as to be sandwiched between the top and bottom surface layers, and heating the thermoplastic material to a temperature at which the thermoplastic material heat softens. During such heating there may also be application of pressure to the sandwich structure. In any case, such heating results in bonding of the thermoplastic material to groups of fiber in the top and bottom surface layers that are in contact with the sandwiched thermoplastic layer as it softens, such that no chemical adhesives are used to adhere the top and bottom surface layers to the thermoplastic material.

In addition, after heat softening, the thermoplastic material includes pores therethrough, providing a fluid pathway therethrough such that any liquid loaded into the top surface layer is able to pass through the pathway, into the bottom surface layer. Such is the case, even where the thermoplastic layer may initially have been an initially liquid impervious film layer, prior to the heating and bonding portion of the process. Once so formed, the multi-layer substrate can be loaded with a cleaning composition, e.g., by applying the cleaning composition to the top and/or bottom surface layer(s). Because of the fluid pathway, fluid communication is possible from one surface layer to the other, through the fluid pathway in the thermoplastic film layer. The multi-layer substrate may be void of any chemical adhesives for holding the plurality of layers together. Binders may technically be present in tissue paper or other pulp layers (e.g., in relatively small amounts) because such binders are frequently used as processing aids in processing pulp material layers, although the purpose of such included materials, like kymene, is to impart strength to the pulp fiber structures (better holding such fibers together, in the fixed web), rather than for any purpose of actually adhering a layer of pulp material to a thermoplastic material layer. Instead, the melted thermoplastic material bonds to groups of fibers (e.g., pulp fibers) in the top and bottom layers that were in contact with the thermoplastic material as it melted.

The referenced tan delta value is defined as the ratio of viscous modulus divided by elastic modulus. It therefore provides information relative to the ratio of a material's viscous liquid phase stiffness or flow characteristics relative to the material's solid phase stiffness characteristics. Different polymeric materials exhibit different tan delta characteristics, and this ratio also varies for a given material with temperature. Polyethylene is an exemplary material that exhibits a tan delta value in a range of 0.2 to 0.4 within the temperature range of 100° F. to 350° F. Other polymeric materials (e.g., polypropylene) do not necessarily exhibit such characteristics. Applicant has found that tan delta is a good indicator of whether a given polymeric material will result in a melted thermoplastic "sandwich" layer that effectively bonds to the exterior nonwoven layers both above and below the thermoplastic inner "sandwich" layer, while at the same time opening up fluid pathways through the thermoplastic layer, allowing liquids (e.g., a cleaning composition) to flow between the top and bottom layers, through the thermoplastic layer.

Another embodiment is directed to a method of manufacturing a multi-layer substrate, comprising providing top and bottom surface layers in which fibers of each surface layer comprise at least 95% by weight pulp fibers, providing a thermoplastic material that comprises polyethylene or has a tan delta value of 0.2 to 0.4 within the temperature range of 100° F. to 350° F., positioning the thermoplastic material so as to be sandwiched between the top and bottom surface layers, creating a sandwich structure having at least 3 layers, and applying a calendaring process to the sandwich structure by heating the sandwich structure to a temperature at which the thermoplastic material melt softens, while applying pressure during such heating. This results in bonding of the thermoplastic material to pulp fibers in the top and bottom surface layers that are in contact with the thermoplastic material as it softens, such that no chemical adhesives are used to adhere the top and bottom surface layers to the thermoplastic material. After calendaring, the thermoplastic material includes open pores through the thermoplastic material, providing a fluid pathway therethrough such that any liquid loaded into the top surface layer is able to pass through the pathway to the bottom surface layer. Once formed, the 3-layer multi-layer substrate is loaded with a cleaning composition.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

FIG. 2 is an SEM image of the top surface of an exemplary multi-layer substrate, showing two adjacent unbonded raised regions, with the bonded region extending there-between.

DETAILED DESCRIPTION OF THE PREFERRED EMBODIMENTS

I. Definitions

Figure 1A:
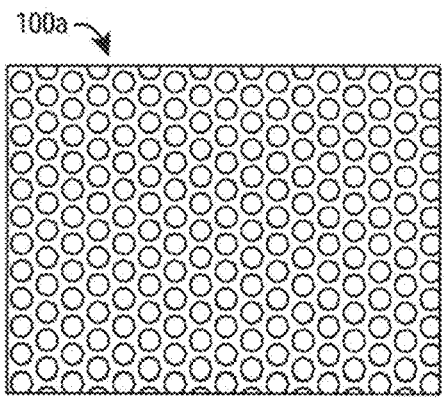
FIGS. 1A-1D show schematic views of exemplary multi-layer substrate textures with various dot patterns.
Figure 1B:
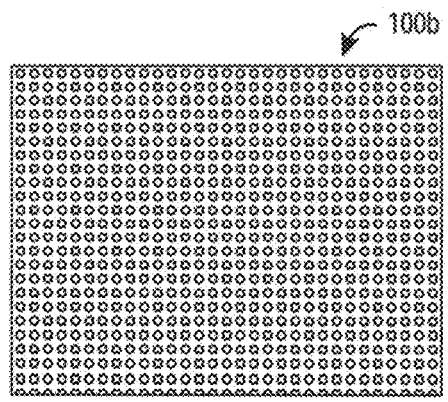
Figure 1C:
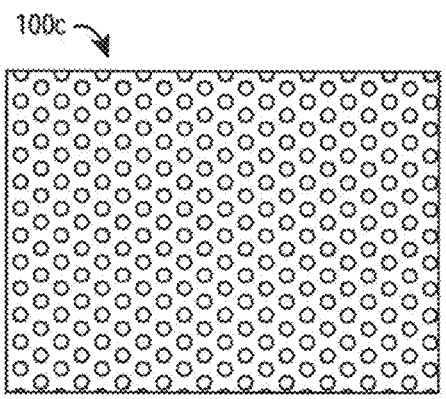
Figure 1D:
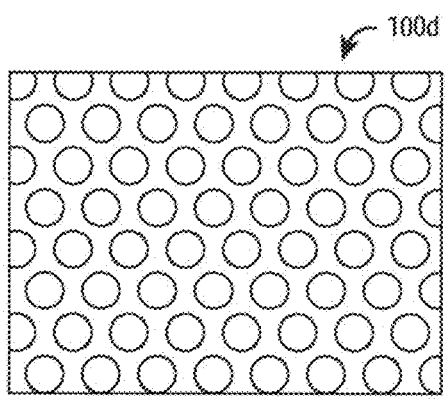

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". Such values thus include an amount or state close to the stated amount or state that still performs a desired function or achieves a desired result. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

As used herein, "disposable" is used in its ordinary sense to mean an article that is disposed or discarded after a limited number of usage events, preferably less than 25, more preferably less than about 10, and most preferably after a single usage event. The wipes disclosed herein are typically disposable.

As used herein, the term "substrate" is intended to include any material that is used to clean an article or a surface. Examples of cleaning substrates include, but are not limited to, wipes, mitts, pads, or a single sheet of material which is used to clean a surface by hand or a sheet of material which can be attached to a cleaning implement, such as a floor mop, handle, or a hand held cleaning tool, such as a toilet cleaning device. The term "substrate" is also intended to include any material that is used for personal cleansing applications. These substrates can be used for hard surface, soft surface, and personal care applications. Such substrates may typically be in the form of a wipe.

The substrates contemplated herein are made up of at least 3 individual, distinct layers, which are bonded together in the described calendaring process. Each layer of the substrate may be formed from individual fibers which are interlaid, typically in a manner that is not identifiable, similar to a nonwoven. Woven layers are also possible. Films, which may not necessarily be fibrous (e.g., for the middle thermoplastic layer) may also be possible (e.g., a cast or blown film that does not necessarily include fibers) The top and bottom surface layers included in the present substrates may be formed by any suitable process, typically through wetlaying, although airlaying may also be possible. Where the exterior surface layers are formed of pulp fibers, wetlaid and airlaid exterior surface layers may be typical. Where synthetic fiber materials could be used for the exterior surface layers, other processes may be used to form such layers that are the starting materials for the present processes. For example, the layer(s) could be meltblown, spunbond, spunlaid, SMS (spunbond-meltblown-spunbond), coformed, carded webs, thermal bonded, thermoformed, spunlace, hydroentangled, needled, or chemically bonded. Various processes for forming such nonwovens will be apparent to those of skill in the art, many of which are described in U.S. Pat. No. 7,696,109, incorporated herein by reference in its entirety. Pulp fibers may generally be ribbon-shaped, rather than the generally circular cross section seen with synthetic fibers. Examples of synthetic fibers often used in forming nonwoven layers and that could be used in multi-layer wipes (e.g., as exterior surface layers) include, but are not limited to, polypropylene, PLA, PET, PVC, polyacrylics, polyvinyl acetates, polyvinyl alcohols, polyamides, polystyrenes, or the like. Polyethylene or other thermoplastic polymers having the desired tan delta characteristics may be useful as the interior thermoplastic material layer. PLA (e.g., a spunbond PLA nonwoven layer, a PLA film, etc.) is an example of another material that may also be suitable for use in one or more of the layers, including as a thermoplastic layer having the desired tan delta properties. It may also be possible to include polyethylene in the exterior surface layers, in some embodiments. The thermoplastic interior layer may be provided as a synthetic nonwoven, formed according to any desired process. The thermoplastic layer may also be a "cast" film, e.g., rather than being comprised of fibers. Such layer could alternatively comprise loose fibers of a material having the desired tan delta characteristics, where a layer of such loose fibers are placed on one of the exterior layers, covered with the other exterior layer, and then processed as described herein. Structured nonwoven fixed fiber forms that do not involve use of loose fibers may be preferred. Avoiding the use of loose pulp fibers in the exterior surface layers (using structured fixed fiber forms) is particularly beneficial. The basis weight of any of the layers of the substrate (and the multi-layer substrate as a whole) may be expressed in grams per square meter (gsm). Basis weight may sometimes also be expressed in "pounds" (e.g., referring to lbs/3000 ft$^2$ of the sheet material). The substrates as a whole may have basis weight values from 30-80 gsm.

The terms "wipe", "substrate" and the like may thus overlap in meaning, and while "wipe" may typically be used herein for convenience, it will be appreciated that this term may often be interchangeable with "substrate".

As used herein, "wiping" refers to any shearing action that the wipe undergoes while in contact with a target surface. This includes hand or body motion, substrate-implement motion over a surface, or any perturbation of the substrate via energy sources such as ultrasound, mechanical vibration, electromagnetism, and so forth.

The cleaning compositions dosed onto the substrate as described herein may provide sanitization, disinfection, or sterilization, other cleaning, or other treatment. As used herein, the term "sanitize" shall mean the reduction of "target" contaminants in the inanimate environment to levels considered safe according to public health ordinance, or that reduces a "target" bacterial population by significant numbers where public health requirements have not been established. By way of example, an at least 99% reduction in bacterial population within a 24 hour time period is deemed "significant." Greater levels of reduction (e.g., 99.9%, 99.99%, etc.) are possible, as are faster treatment times (e.g., within 10 minutes, within 5 minutes, within 4 minutes, within 3 minutes, within 2 minutes, or within 1 minute), when sanitizing or disinfecting.

As used herein, the term "disinfect" shall mean the elimination of many or all "target" pathogenic microorganisms on surfaces with the exception of bacterial endospores.

As used herein, the term "sterilize" shall mean the complete elimination or destruction of all forms of "target" microbial life and which is authorized under the applicable regulatory laws to make legal claims as a "sterilant" or to have sterilizing properties or qualities. Some embodiments may provide for at least a 2 or more log reduction (e.g., 3-log reduction, or 6-log reduction) in a bacterial population within a designated time period (e.g., 10 minutes, 5 minutes, 4 minutes, 3 minutes, 1 minute, 30 seconds, 10 seconds or the like). A 2-log reduction is equivalent to a 99% reduction, a 3-log reduction is equivalent to at least a 99.9% reduction, a 4-log reduction is equivalent to at least a 99.99% reduction, a 5-log reduction is equivalent to at least a 99.999% reduction, etc. An example of a target microbe may be *Staphylococcus aureus*. It will be appreciated that microefficacy can also be achieved against other target microbes, numerous examples of which will be apparent to those of skill in the art. It will also be appreciated that the present cleaning compositions need not include an antimicrobial agent, where sanitization or disinfection is not necessarily desired.

The term "texture" as used herein refers to the character or appearance of a substrate as determined by the arrangement and thickness of its constituent fibers. In at least some instances, texture can be quantified using imaging techniques and/or caliper measurements at the local and macro scales, as described in Applicant's application Ser. No. 16/042,690, filed Jul. 23, 2018 (Docket No. 510.174), herein incorporated by reference in its entirety. By way of explanation, "patterns" are typically visual, with areas of discernable contrast. "Texture" is typically tactile, and relates to variations relative to the normal plane of the substrate (i.e., 3-dimensional texture in the substrate). Visual pattern and tactile texture interact in a complex manner with a user's visual/tactile sense of sight and touch to produce a given aesthetic perception for a given substrate, in addition to other quantifiable technical characteristics associated with such.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to methods for manufacturing multi-layer substrates including at least 3 layers. In an embodiment, the exterior faces of the wipe are provided by structured plant based fibers (fixed fibers, rather than loose fibers), such as structured, fixed wood pulp fibers (e.g., tissue paper). Where used, the term "tissue" is used for convenience, and it will be appreciated that it is intended to be broadly construed, including tissue paper materials, as well as other similar materials formed from pulp. Synthetic exterior layers such as meltblown, spunbond, spunlaid, SMS (spunbond-meltblown-spunbond), coform, carded webs, thermal bonded, thermoformed, spunlace, hydroentangled, needled, or chemically bonded fibers may also be suitable for processing according to the present methods, e.g., as described in Applicant's Application bearing Clorox Docket No. 510.186. Configurations based on tissue exterior layers re described in Applicant's Application bearing Clorox Docket No. 510.188, each of which is herein incorporated by reference in its entirety.

An interior "sandwich" layer comprising a thermoplastic material (e.g., different from the exterior layers) is provided, between the tissue or other pulp layers (or other top and bottom exterior layers), which adheres the entire multi-layer substrate together in a single mass, with low risk of delamination, while providing desired characteristics relative to hand-feel, stiffness, and absorbency (ability to load the substrate to a desired loading ratio with a cleaning composition), while also providing a fluid pathway through the thermoplastic layer through which the cleaning composition can migrate from the top surface layer, to the bottom surface layer, or vice versa. Because the thermoplastic layer melts in contact with fibers of the adjacent exterior surface layers, and particularly given the tan delta characteristics of the thermoplastic material, the melt softened thermoplastic material encapsulates, envelops, wraps, or otherwise coats individual adjacent fibers of the exterior surface layer, providing a strong bond between the two adjacent layers, such that delamination does not readily occur. Even if a synthetic fiber were used in the exterior layers, the fibers of the exterior surface layers may provide differing characteristics, such that they do not melt soften in the same way the interior sandwich layer does, at the given processing conditions. In addition, the thermoplastic sandwich "cheese" layer typically does not penetrate through the exterior "bread" surface layers, so that none of the melt softened thermoplastic material with specific tan delta characteristics is on the exposed exterior faces of the wipe. This results in the advantage that relatively softer (e.g., pulp) fibers are used for wiping and cleaning versus contact with harder more abrasive synthetic melt softened fibers. The wipe may thus be less harsh on the surfaces being treated so as to reduce risk of undesirable mechanical scratching, abrasion, or erosion.

Such multi-layer substrates may be formed through a thermal and pressure calendaring process in which the top and bottom layers are provided preformed (e.g., the tissue or other layers are provided preformed, with the fibers already in a structure, fixed form, as a structured sheet, such as a nonwoven), and a thermoplastic material comprising polyethylene or another polymer having suitable tan delta values is also provided. The thermoplastic material may also be in the form of a structured sheet (e.g., also a nonwoven, as a cast film, etc.), or may even be provided as loose fibers that are positioned onto a face of the bottom exterior layer, covered by the top exterior layer, and then calendared.

Many commercially available multi-layer hard surface cleaning substrates have external layers made of synthetic thermoplastic materials such as polyethylene, polypropylene, PET, and other commonly used synthetic materials, which can be abrasive and harsh. Typically, a layer of pulp fibers is provided in the middle of the synthetic material layers so that the pulp fibers are not lost through abrasion during the cleaning process. In contrast, embodiment of the present invention including pulp fibers have the opposite configuration where the layers of pulp materials are in a top surface layer and a bottom surface layer and the thermoplastic material is between the pulp material layers. In any case, the described process and 3-layer configuration allows bonding of the 3 layers into an integral, single substrate structure, without the need for any chemical adhesives.

The layers may be assembled, e.g., with the tissue or other exterior layers as "bread" sandwiching the thermoplastic film layer (as "cheese") therebetween, followed by subjecting the assembly to heat (and typically pressure) at a temperature and time period that melt softens the thermoplastic material. This heating may open up pores through the thermoplastic material, even if it was provided as a liquid impervious film layer prior to the treatment. Heat softening of the thermoplastic material also causes it to wrap around or otherwise coat and envelop the adjacent fibers of the top and bottom surface layers, effectively tying the adjacent layers to one another, without any chemical adhesive to prevent the layers from delaminating or pulling apart from one another. As mentioned, at the same time that this layer bonding occurs, any liquid impervious film characteristics that may have previously existed with respect to the interior thermoplastic layer are broken, so that a fluid pathway is created through the thermoplastic layer, through which a cleaning composition or other liquids applied to either the top or bottom layer can penetrate from one surface layer to the other surface layer, through the thermoplastic film layer.

Once the dry substrate has been formed, a desired cleaning composition may be loaded onto the multi-layer substrate. Because of the presence of the fluid pathway, even if the cleaning composition is loaded as a liquid into only one of the top or bottom layers, it will flow through the substrate to the other exterior layer through the broken thermoplastic layer.

III. Exemplary Multi-Layer Substrates

Figure 1E:
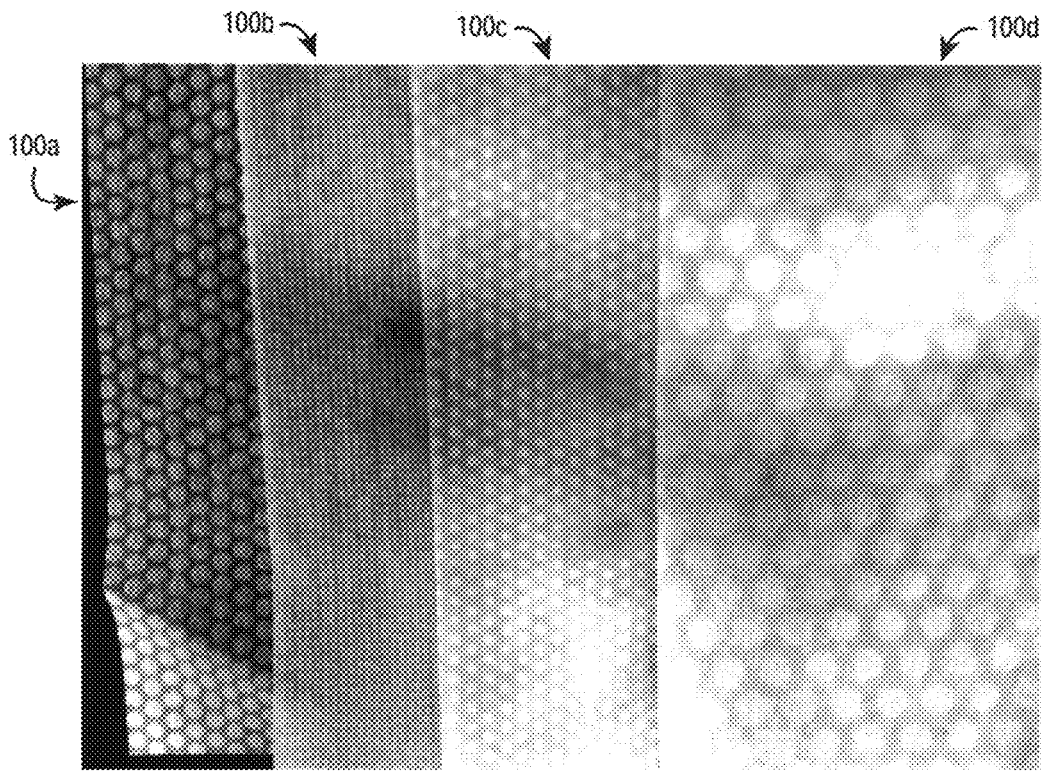
FIG. 1E is a photograph showing 4 different exemplary multi-layer substrate textures that were actually formed, each with differently sized unbonded raised texture features (i.e., raised dots).

FIGS. 1A-1D illustrate exemplary wipes 100a-100d, each with a different applied surface texture and bonding pattern, but where each is configured as a multi-layer substrate including a melted thermoplastic layer sandwiched between top and bottom pulp fiber or other exterior surface layers. While shown with various textures, it will be appreciated that numerous other textures could be provided, or perhaps no texture at all. Additional exemplary textures are shown in FIGS. 7A-7F. FIG. 1E shows photographs of 4 exemplary multi-layer wipes 100a-100d that were actually manufactured for evaluation.

Figure 2:
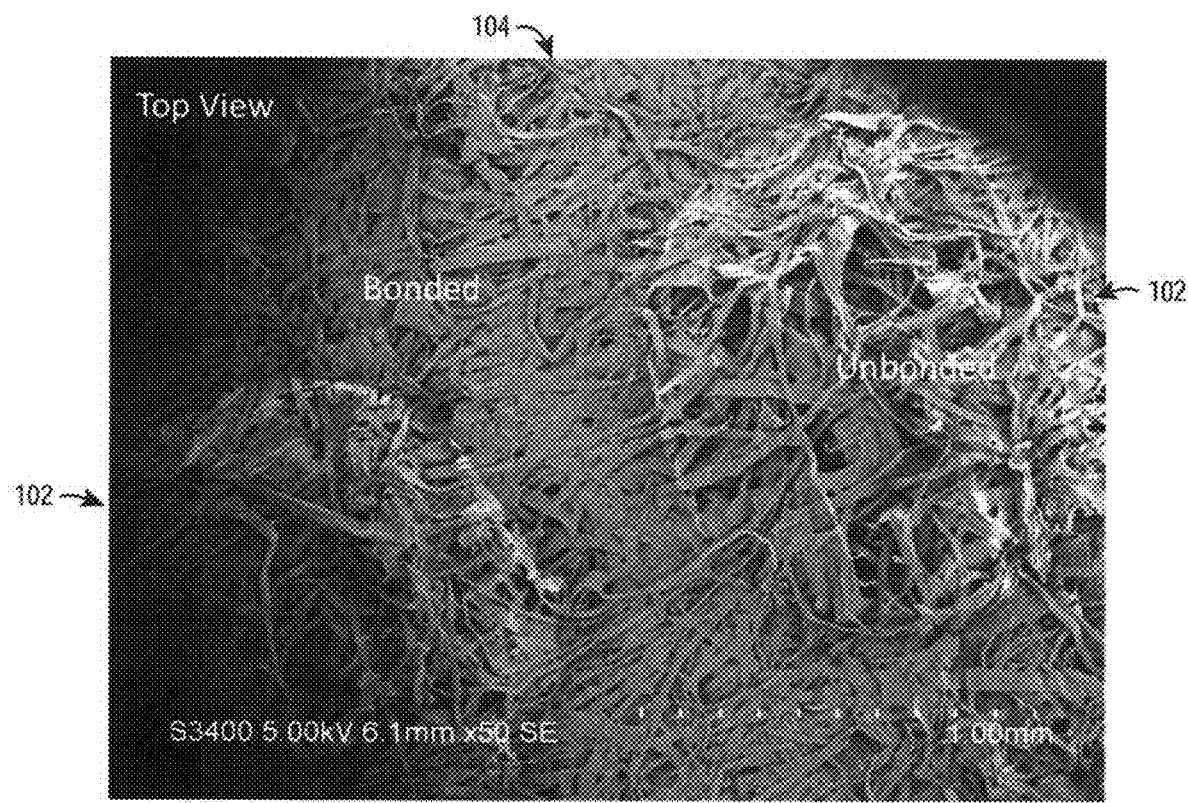

FIG. 2 shows a close up of one of the raised ridges 102 of an exemplary wipe, showing how the raised circular ridge 102 (a "dot") is unbonded to the thermoplastic film layer disposed therebelow, such that there is actually a gap therebetween, at the ridge 102. The region 104 surrounding the raised ridge 102 is bonded (and is so labeled) to the underlying thermoplastic film layer disposed therebelow. Depending on the particular applied textured pattern, the bonded region 104 may be contiguous, as shown (i.e., there is a single contiguous bonded region, rather than multiple bonded regions that are fully separated from one another). In other words, by "contiguous", one can reach any particular location in the bonded region from any other particular location in the bonded region, by traversing only other bonded regions, without any need to traverse an unbonded region. The bonded region 104 may thus be contiguous, even though it does not cover the entire top exterior face (or bottom exterior face) of the wipe, because there are spaced apart unbonded regions 102. Stated another way, by analogy, the unbonded regions may be configured as "islands" in a "sea" of the bonded region. It will be appreciated that other configurations are of course possible.

The texture may be an embossed texture that is applied during the thermal calendaring or other manufacturing operation that laminates the 3 layers of the "sandwich" structure together. Alternatively, the texture could have been introduced into the substrate structure as a result of the geometry used in the forming screen used during the tissue making process, when depositing the pulp fibers that make up the tissue or other exterior surface layer(s).

Figure 3:
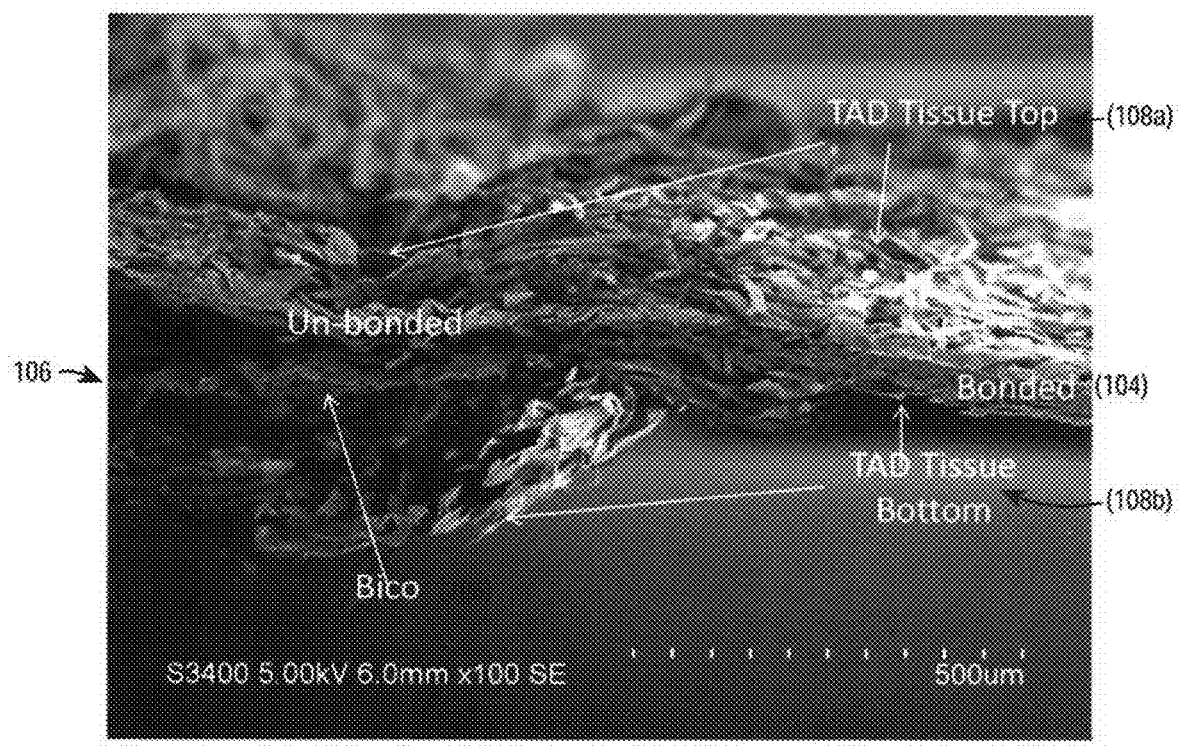
FIG. 3 shows an SEM image of an cross-sectional or edge view through an exemplary multi-layer substrate such as that of FIG. 2, showing the top surface layer, the bottom surface layer, and the thermoplastic film layer sandwiched therebetween, where there are both bonded regions, and regions in which the thermoplastic layer and the adjacent exterior surface layer are unbonded relative to one another.

From FIG. 2, it is apparent that the pulp fibers of the top surface layer (as well as the bottom surface layer) are ribbon shaped, rather than being generally circular in cross-section, as is the case with typical synthetic fibers of non-woven substrates. Such ribbon-shaped fibers rather have a generally rectangular cross-section, as opposed to being circular in cross-section. FIG. 3 is an SEM image of an end or cross-section through an exemplary multi-layer substrate, such as that of FIG. 2, showing the thermoplastic film layer 106 (labeled "Bico") sandwiched between a through-air-dried ("TAD") pulp fiber top surface layer 108a, and a TAD pulp fiber bottom surface layer 108b. Also labeled in FIG. 3 is a bonded region 104, as well as an unbonded region, adjacent a raised ridge "dot" of the bottom pulp fiber layer 108b. In this labeled unbonded region, there is a gap between the thermoplastic layer 106 and the bottom pulp fiber layer 108b. While in this region the bottom pulp fiber layer 108b is unbonded, in this same region, the thermoplastic layer 106 may (or may not be) bonded to the top pulp fiber layer 108a. In other words, the unbonded characteristic may apply to one or both faces of the thermoplastic layer.

a. Pulp Characteristics

The fibrous portion of the top and bottom surface layers of the multi-layer substrates may be formed predominantly, and in an embodiment entirely, from pulp fibers, e.g., wood pulp or other plant fibers. Even where the thermoplastic layer is clearly not comprised of such pulp fibers (as it is instead a synthetic thermoplastic polymeric material, (e.g., having particular tan delta value characteristics), the substrate as a whole is one in which a majority of the fiber weight of the substrate may be pulp. For example, greater than 70% (by weight) of the fibers of the substrate may be pulp fibers. In an embodiment 75% to 90%, 75% to 85%, or 75% to 80% of the fibers in the substrate may be pulp fibers, by weight. In other words, synthetic fibers may account for less than 30%, such as 10% to 25%, 15% to 25%, or 20% to 25% by weight of the fibers. Such is the case where the thermoplastic interior layer is a fibrous film (e.g., a thin spunbond film). It will be appreciated that in another embodiment, the thermoplastic film may not necessarily be fibrous, e.g., such as in the case of a cast or "bubble" blown film that is not made up of numerous fibers, but is simply a continuous thin (e.g., cast) sheet. In such an embodiment, the thermoplastic material may still account for less than 30%, 10% to 25%, 15% to 25%, or 20% to 25% of the dry substrate, but may simply be in non-fibrous form (e.g., a cast or blown sheet). In such a case, technically, 100% of the fibers of the substrate may be pulp fibers.

In an embodiment, all fibers of the top surface layer and bottom surface layer may consist of or consist essentially of pulp fibers. For example, these layers may not include any synthetic fibers, or any synthetic structural components (e.g., no synthetic fillers). By forming the multi-layer substrates from a high fraction of pulp, the substrates may be more sustainably sourced, e.g., where a higher fraction of the components used are derived from sustainable sources as compared to, e.g., existing wipes formed from a blend of pulp and synthetic fibers. In addition, the location of pulp versus synthetic materials in the wipe may differ in that all pulp may be in the exterior surface layers, rather than having pulp fibers intermixed (e.g., homogenously) through a given (e.g., interior) layer.

The pulp fibers may typically be obtained from wood, although other possible sources of pulp are also possible, e.g., from cotton, Esparto grass, bagasse, hemp, flax, jute or the like. Combinations of more than one material may be used. Various exemplary pulp fibers may include, but are not limited to, thermomechanical pulp fibers, chemimechanical pulp fibers, chemithermomechanical pulp fibers, refiner mechanical pulp fibers, stone ground wood pulp fibers, peroxide mechanical pulp fibers, and the like. The fibers of the pulp substrate may generally comprise cellulosic fibers, which are typically hydrophilic. Such hydrophilicity differs from many synthetic fibers, which are typically hydrophobic, absent special treatment.

Additional details relative to exemplary pulp fibers are found in Applicant's application Ser. No. 16/042,690, filed Jul. 23, 2018 (Docket No. 510.174), already herein incorporated by reference herein. Such characteristics can be specifically selected to ensure sufficient quat release, as well as other characteristics.

b. Other Top and Bottom Exterior Surface Layers

The top and bottom surface layers may alternatively be formed from a material that comprises synthetic fibers, or a blend of pulp and synthetic fibers. Any of various nonwoven materials may be used, which are widely available from various commercial sources. Such layers and fibers may be meltblown, spunbond, spunlaid, SMS (spunbond-meltblown-spunbond), coform, carded webs, thermal bonded, thermoformed, spunlace, hydroentangled, needled, or chemically bonded. In an embodiment, such surface layers may also incorporate a fraction of pulp fibers therein (e.g., as a homogenous blend of randomly distributed synthetic and pulp fibers, or where the pulp fibers are positioned non-randomly, e.g., at an exterior, or at an interior surface).

In any case, the fraction of synthetic fibers within the top and bottom exterior surface layers may be at least 50%, at least 60%, at least 70%, at least 80%, at least 90%, or at least 95%, by weight, of the fibers present in a given layer. In an embodiment, 100% of the fibers in a given exterior surface layer may be synthetic fibers.

A wide variety of synthetic materials that can be formed into fibers, and laid into a nonwoven substrate layer are appropriate for use in the contemplated multi-layer substrates. Examples of such polymeric synthetic materials include, but are not limited to polyethylene, polypropylene, PET, PVC, polyacrylics, polyvinyl acetates, polyvinyl alcohols, polyamides, polystyrenes, or the like. In an embodiment, the external surface layers may comprise a material other than polyethylene, and/or a material that does not have the tan delta characteristics possessed by the internal thermoplastic layer, which is configured to be melt-softened, bonding the 3 layers together.

No matter the choice of materials in the top and bottom surface layers (e.g., pulp or synthetic), the top and bottom layers of the multi-layer substrate may have a basis weight of no more than 50 lbs, no more than 40 lbs, no more than 30 lbs, or no more than 20 lbs, at least 3 lbs, at least 5 lbs, or at least 10 lbs, such as from 7 lbs to 20 lbs, or 8 lbs to 15 lbs. Such "lbs" values refer to the weight per/3000 ft$^2$, as will be appreciated by those of skill in the art. The multilayer substrate as a whole may have a basis weight of 30-80 gsm.

In an embodiment, the top and bottom layers comprise pulp fibers, and do not include any added synthetic fibers, e.g., such as various polyolefins or other fibers formed from synthetic polymers, e.g., polyethylene, polypropylene, PET, PVC, polyacrylics, polyvinyl acetates, polyvinyl alcohols, polyamides, polystyrenes, or the like. While such synthetic fibers are widely used in the manufacture of nonwoven substrates, such embodiments may seek to reduce the use of such non-sustainable materials. Furthermore, by limiting or eliminating their use in the top and bottom exterior surface layers, additional benefits can be provided. For example, the present wipes can provide functional parity, and sometimes advantages, over conventional nonwoven wipes in durability, safety for use on all surfaces, ease and convenience, ability to clean and absorb light liquid spills, ability to clean large areas effectively, and microefficacy in the case of sanitization or disinfection. Furthermore, the use of significant quantities of synthetic resins in existing pre-moistened nonwoven wipes represents a significant expense, such that cost savings, renewability and sustainability benefits, and biodegradability benefits can be achieved using pulp substrates, as described herein.

The individual layers of the top and bottom (e.g., pulp fiber) layers that are used in manufacturing the multi-layer substrate can be formed by any of a number of different techniques, e.g., such as any of those suitable for use in forming tissue layers. Examples include, but are not limited to wet-laying and air-laying, as well as conventional press-drying, and through-air drying techniques. Methods of making such substrate layers will be apparent to those of skill in the art. Wet-laying processes are described in U.S. Pat. Nos. 5,246,772 and 5,238,534 to Manning. Air-laying processes are described in U.S. Patent Publication No. 2003/0036741 to Abba et al. and U.S. Patent Publication No. 2003/0118825 to Melius et al. Conventional processes by which a manufactured substrate in a wet condition is pressed to remove process water, as well as through-air-drying processes will be familiar to those of skill in the art. In an embodiment, the top and bottom tissue layers are formed by through-air-drying.

Such processes are typically carried out prior to the positioning and calendaring processes described herein, e.g., where the inputs to the presently described process are nonwovens or similar structured sheet or web materials, already processed into such structured sheets, so that the present processes do not require use of loose fibers (particularly loose pulp fibers), do not require use of process water to maneuver fibers along the plane or through a thickness of the given sheet or web (as the sheet or web is already formed in the material used as an input to the present process), do not require drying or another mechanism for removing process water, and do not require use of chemical binders to adhere the various layers to one another (as this is achieved through melt softening the interior thermoplastic layer).

Where tissue layers are used as the exterior surface layers, one or both of the tissue layers may comprise more than a single ply, or each may comprise only a single ply. Where multiple plies are provided, they may be adhered together, so as to have adequate peel strength, e.g., as described in Applicant's application Ser. No. 16/042,690, filed Jul. 23, 2018 (Docket No. 510.174), already incorporated by reference. Where only a single ply is present in each of the top and bottom tissue layers, no chemical adhesive may be present anywhere in the multi-layer substrates. Where two plies are used in either or both of the tissue layers, a chemical adhesive may be present in the tissue layers (i.e., between plies), but may not be present between the thermoplastic layer and the adjacent top and bottom tissue layers.

c. Thermoplastic Layer

The present multi-layer wipes include a sandwich structure in which a thermoplastic layer is provided, on the inside of the wipe, sandwiched between the top and bottom surface layers (e.g., pulp layers). While in an embodiment, the surface layers could also be thermoplastic, these exterior layers may include different tan delta characteristics than the sandwiched thermoplastic layer. Where no chemical adhesive is used to adhere the 3 layers into an integral, single structure that does not readily delaminate between layers, but in which the thermoplastic sandwich "cheese" layer itself is used for this purpose, the Applicant has found that not just any thermoplastic polymer will be suitable for such a purpose. For example, in testing various thermoplastic polymers, Applicant found that various materials, even upon heating, will not readily bond to the adjacent pulp fiber or other nonwoven top or bottom surface layers, but will form a very weak bond, if any at all. Such weak bonding is of course unacceptable in a multi-layer substrate to be used as a cleaning wipe, where delamination must be avoided. In the present invention, the multi-layer substrates have sufficient adhesion between the layers that they do not delaminate even when wet (e.g., allowed to soak for weeks, in storage) or when used for cleaning hard surfaces. The interior thermoplastic layer not only binds the multi-layer substrate together as it melts, but it also may impart additional strength to the exterior layers, where these layers may be relatively weak. It is surprising that this binding of the exterior layers occurs so well that there is not any significant shredding of the exterior surface layer, e.g., as the multi-layer substrate is pulled through a typical wipe dispensing orifice, even where such exterior layers consist essentially of pulp fibers (e.g., tissue). Values and testing protocols that may be applicable to the peel strength provided by the present bonding processes between the interior thermoplastic layer and the exterior surface layers are disclosed in Applicant's Application bearing Clorox Docket No. 425.372, herein incorporated by reference in its entirety.

Applicant found that while polypropylene may seem like a suitable thermoplastic material to achieve sufficient bonding between the top and bottom pulp fiber or other nonwoven surface layers separated by the interior thermoplastic material layer, polypropylene did not provide good bonding, but resulted in weak bonding and delamination between the 3 layers. Applicant found a key characteristic or indicator as to whether a given thermoplastic material would work, is tan delta value. Tan delta value is an engineering characteristic that can be evaluated for thermoplastic polymeric materials, and gives information relative to how much "liquid" viscous phase characteristics dominate versus "solid" elastic phase characteristics, in a given material, at a given temperature. Tan delta is simply calculated as the ratio of viscous modulus divided by elastic modulus for a given material, at a given temperature.

Figure 4:
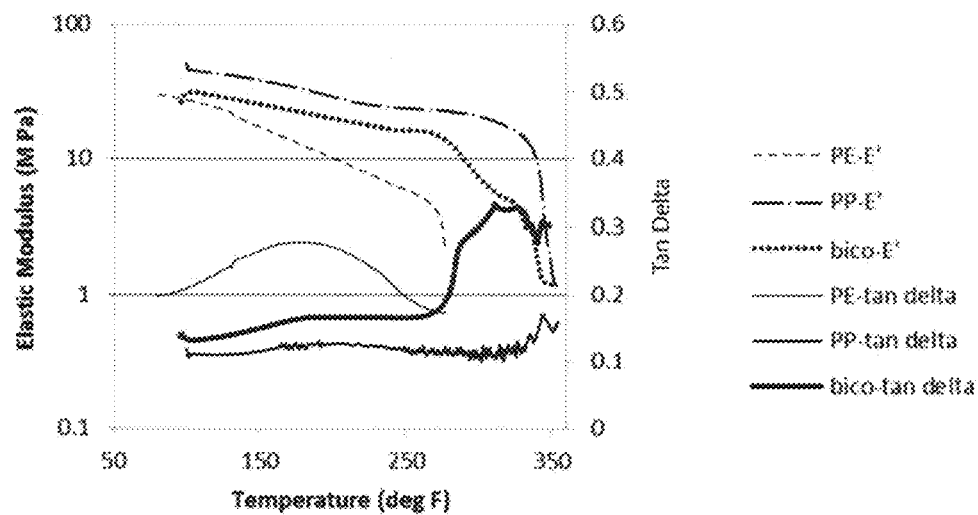
FIG. 4 is a chart showing elastic modulus and tan delta values versus temperature for polyethylene, polypropylene, and for a polymer comprised of "bicomponent" core/sheath type fibers, i.e., a ("bico") polymer.

FIG. 4 charts both tan delta and elastic modulus values for 3 tested thermoplastic materials—polyethylene, polypropylene, and a bicomponent material that comprises polyethylene. For example, the bicomponent material tested is believed to be comprised of bicomponent fibers, with a fiber core (that is not polyethylene), and an exterior coating or sheath on the core, that is polyethylene. FIG. 4 charts both elastic modulus and the tan delta value for these 3 materials over the temperature range of about 100° F. to 350° F. FIG. 4 shows how the elastic modulus (i.e., stiffness) of the polypropylene is the highest, followed by the "bico", followed by the polyethylene, and that the stiffness of each decreases with increasing temperature.

The tan delta value for the polypropylene is very low, less than 0.2, and remains less than 0.15 at temperatures from 100° F. to over 300° F. It isn't until nearly 350° F. that the tan delta value increases somewhat, but only slightly, up to a value of about 0.15, and certainly still less than 0.2. The polyethylene tan delta value is quite different, being about 0.2 at a temperature of 100° F., and increasing to about 0.25 to 0.3 at about 175° F.-190° F. After peaking at around this temperature, the tan delta value begins to decrease, to 0.2 at about 250° F., and dropping somewhat below 0.2 (e.g., about 0.18) at about 260°–270° F. Tan delta for the "bico" is between that of the polypropylene and the polyethylene for much of the temperature range, until about 250° F. where it is higher than the polyethylene. Both the polyethylene and the "bico" material (which comprises polyethylene) include points along the temperature range of 100° F. to 350° F. where tan delta is at least 0.2 (e.g., greater than 0.2 to 0.4, or greater than 0.2 to 0.3), meeting the stated requirement. The polypropylene tan delta never reaches 0.2 over this temperature range of 100° F. to 350° F. Thus, in an embodiment, the selected thermoplastic material for the interior "sandwich" layer has a tan delta value that is at least 0.2 (e.g., from 0.2 to 0.4, or from 0.2 to 0.3) somewhere within the temperature range of 100° F. to 350° F. In an embodiment, the selected thermoplastic material may have such a tan delta value at the particular temperature at which the thermal calendaring step is performed (e.g., 150° F., 175° F., 200° F., 225° F., 250° F., 275° F., 300° F., 325° F., etc.) or at any narrower range within the temperature range of 100° F. to 350° F.

The selected thermoplastic material may advantageously have a melting temperature that is less than 400° F., less than 375° F., less than 350° F., less than 325° F., less than 300° F., at least 150° F., at least 175° F., at least 200° F., or at least 225° F. Having a relatively lower melting temperature of course reduces energy requirements needed in the calendaring process, but may also be important depending on what materials are used in the top and bottom surface layers, to ensure they do not decompose, ignite, or melt. Where any pulp fiber content is included in the exterior surface layers, it can be important to ensure the temperature is low enough that such pulp fibers do not ignite, or become embrittled or discolored due to "burning", which may occur even below the paper ignition temperature of 451° F. As such, selection of lower melting temperature thermoplastic materials may be preferred, so long as they can provide a good bond to the exterior top and bottom layers.

The interior thermoplastic layer may comprise, e.g., at least 25%, at least 30%, at least 35%, at least 40%, at least 50%, at least 55%, at least 60%, at least 65%, at least 70%, at least 75%, at least 80%, at least 85%, at least 90%, at least 95%, from 25% to 100%, from 30% to 100%, or from 50% to 100% of a material having the desired tan delta characteristics. As illustrated by the bico fiber material, some portion or component of the thermoplastic material may not have the stated tan delta characteristics, so long as the thermoplastic material as a whole includes such characteristics. For example, the bico fiber is believed to include a polypropylene core, which does not have the stated tan delta characteristics, although the sheath portion of the fiber is believed to be polyethylene, which does have the stated tan delta characteristics. As shown by FIG. 4, the bico fibers as a whole do meet the stated tan delta characteristics. Where the thermoplastic material is a bicomponent fiber or other bicomponent (or other multicomponent) structure, e.g., such as a layered film or the like, the polyethylene or other material having the stated tan delta characteristics may be positioned on the exterior of the thermoplastic material, so as to easily contact the adjacent exterior surface layers during the calendaring process.

Figure 5A:
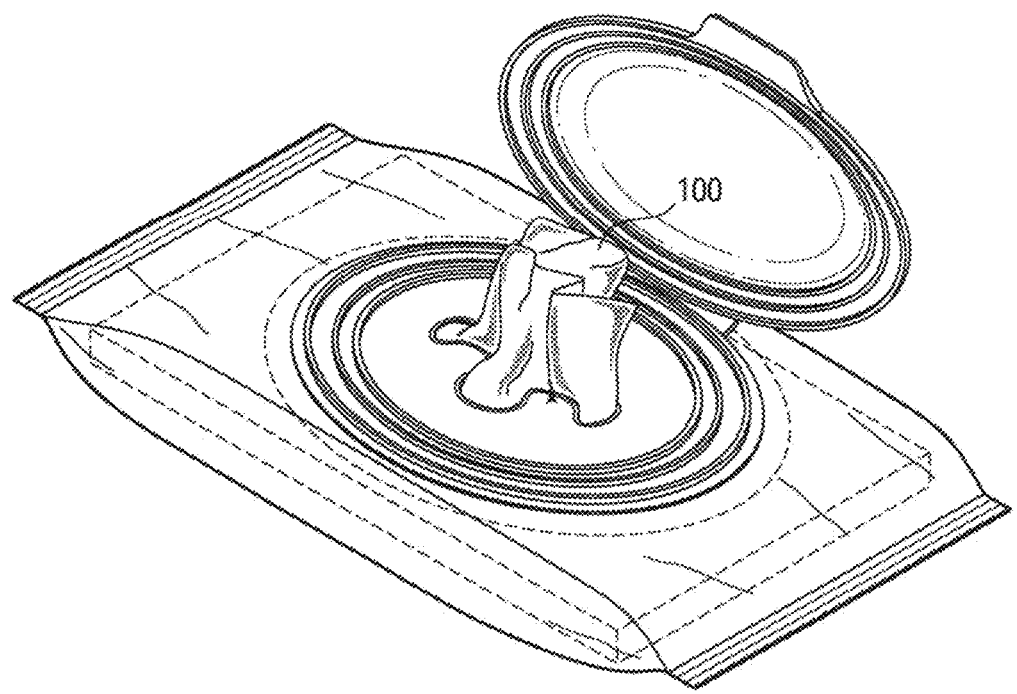
FIGS. 5A-5B illustrate various exemplary wipes packages, showing how the present multi-layer substrate wipes can be pulled through a typical wipe pack orifice, without significant shredding of the exterior layers, even where such layers are pulp fiber layers.
Figure 5B:
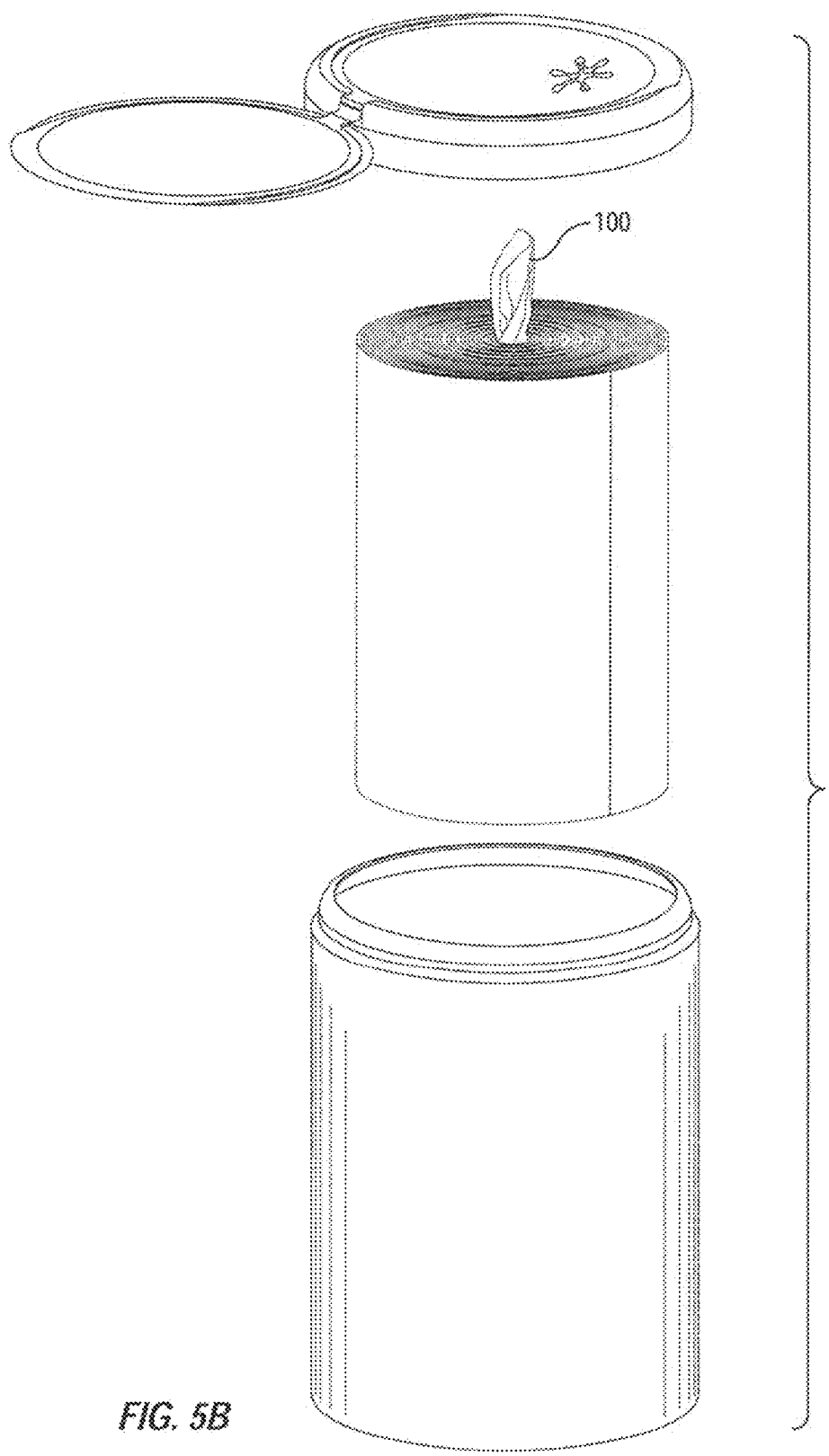
Figure 6:
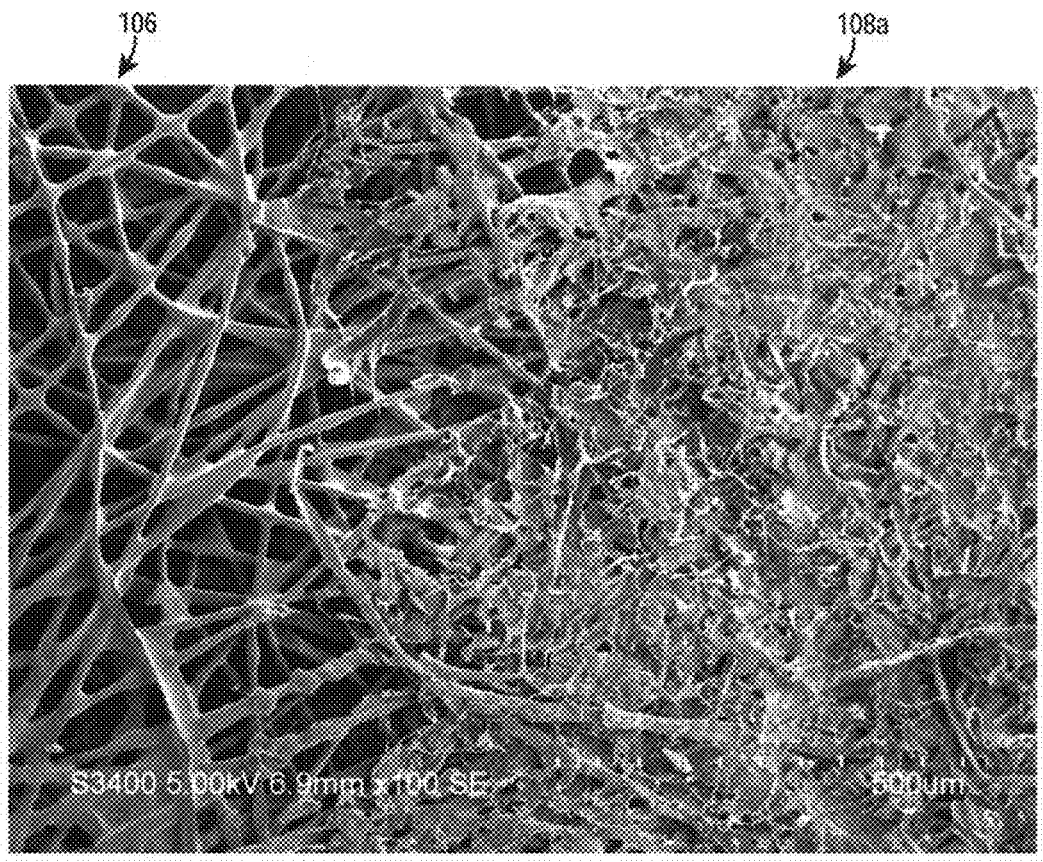
FIG. 6 is an SEM image showing spunbond thermoplastic fibers enveloping adjacent pulp fibers of the adjacent top surface layer.
Figure 7A:
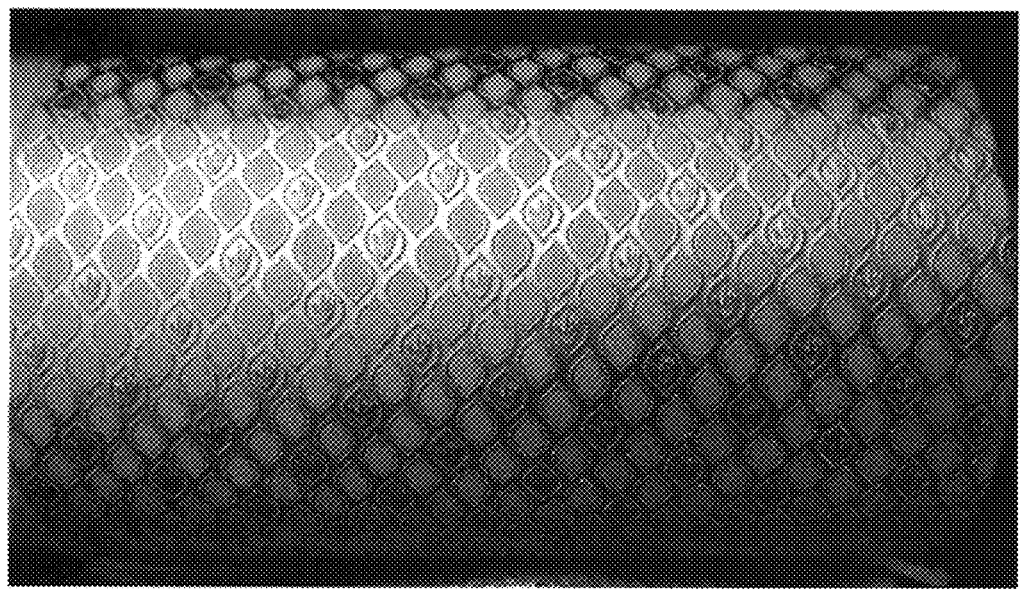
FIGS. 7A-7F illustrate additional exemplary textures and patterns that could be applied during calendaring.
Figure 7B:
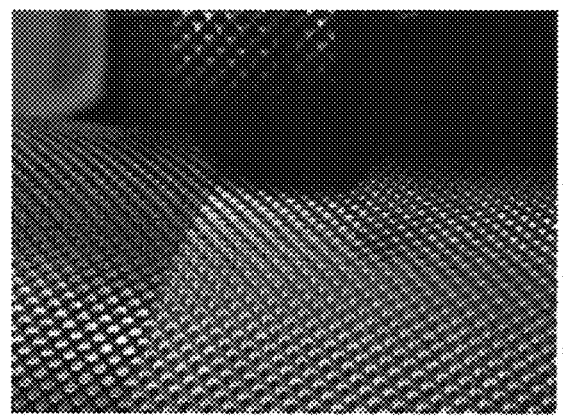
Figure 7C:
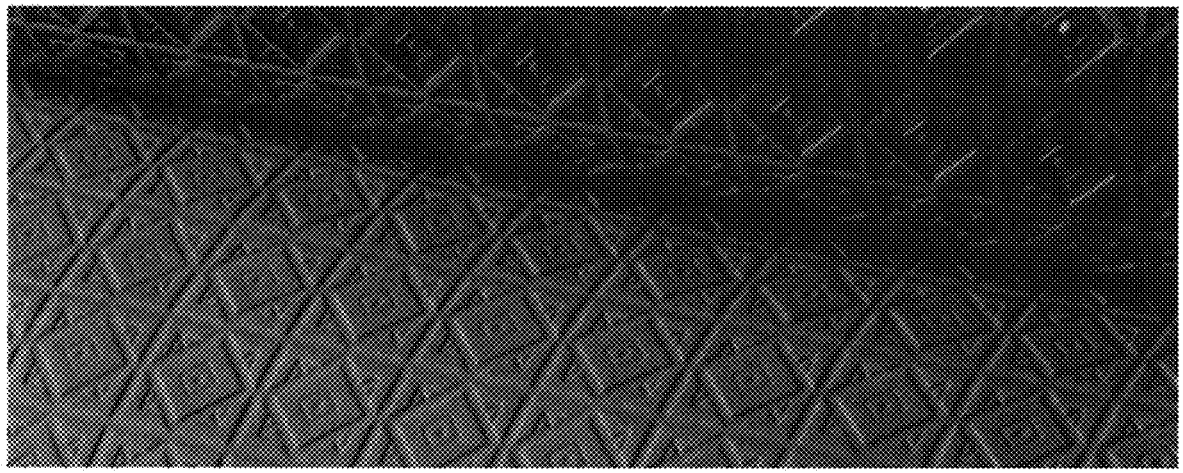
Figure 7D:
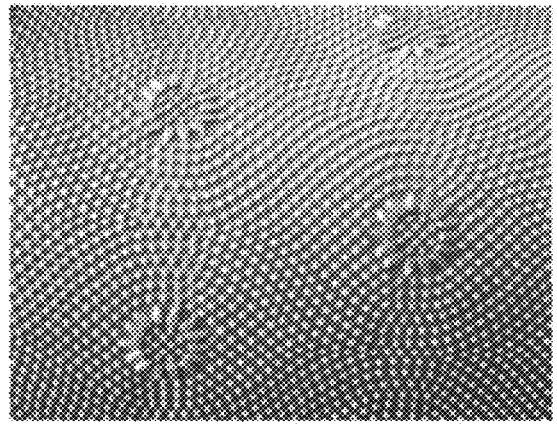
Figure 7E:
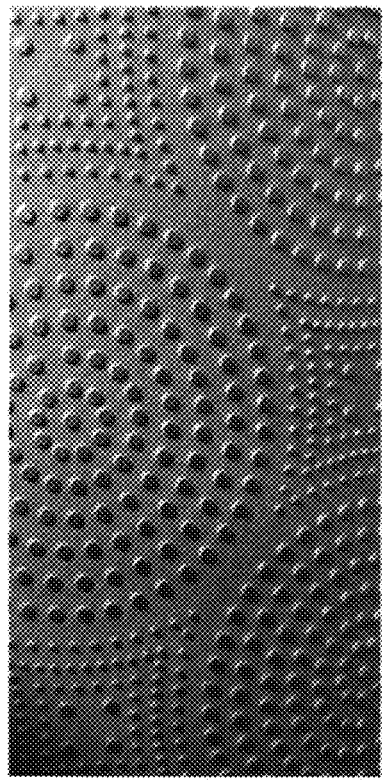
Figure 7F:
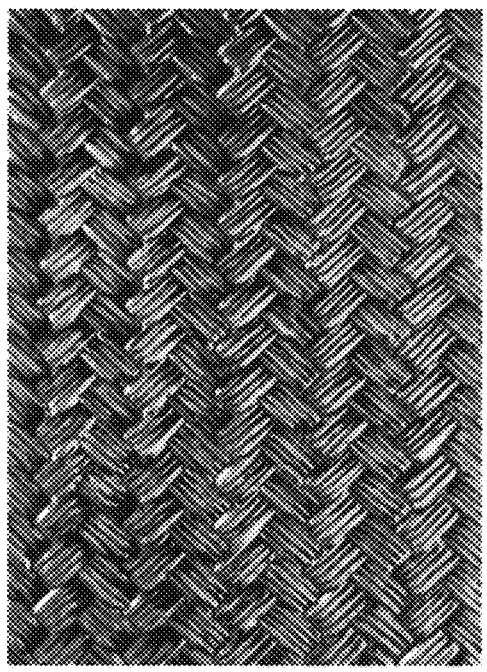

FIGS. 5A-5B show how the present multi-layer substrates may be packaged within any of various exemplary flex packs (FIG. 5A), cylinders (FIG. 5B) or other containers for storage and dispensing. The wipes 100 may be pulled through an orifice such as typically provided with such containers, without fear of shredding or delamination of the various layers. In particular, Applicant tested prototype wipes such as shown in FIG. 1E by pulling them through orifices (e.g., as seen in FIGS. 5A-5B), and there was no significant shredding of the exterior tissue layers, or delamination of the layers from one another. Rather, each wipe was able to be pulled through the orifice, remaining fully intact, time after time. FIG. 6 shows an SEM image at the interface between a spunbond fibrous thermoplastic layer 106 and an adjacent exterior tissue layer (e.g., 108a) showing how the pulp fibers at the interface are wrapped around, enveloped, or coated by the melt-softened thermoplastic material, that occurs during the thermal calendaring process. This strong connection between the pulp fiber layer and the thermoplastic layer provides a strong bond, so that shredding or delamination does not occur when pulling the wipe through a typical wipe pack orifice. These characteristics are believed to result because of the tan delta characteristics of the thermoplastic material described above in conjunction with FIG. 4.

FIG. 5B further shows how such wipes may be packaged as a "donut", e.g., in a cylindrical container. The ability to package the wipes in such a donut configuration is somewhat surprising when the exterior surface layers are pulp, given the high pulp content (e.g., 75-80% pulp) of the substrate. For example, it is difficult to package pre-dosed 100% pulp substrates in such a configuration without the donut collapsing or creasing vertically, due to insufficient wet stiffness of the substrate.

The thermoplastic film layer is not required to be particularly thick. For example, the thermoplastic film layer may have a thickness of 0.01 mm to 0.1 mm, or 0.01 mm to 0.05 mm. It may be so thin as to be transparent or translucent, prior to assembly into the sandwich structure. That said, it will be apparent that if desired, the thermoplastic middle sandwich layer may be thicker. For example, it may have a thickness that varies depending on the structural characteristics of such layer (e.g., whether it is deposited as loose fibers (e.g., loose bico fibers, or loose fibers otherwise comprising a material having the desired tan delta characteristics), an intact film, yarn (e.g., loose yarn), an intact nonwoven layer, a woven layer, or the like). It will be apparent that the thermoplastic middle sandwich layer may thus have a thickness ranging from 0.01 mm to 5 mm, from 0.01 mm to 3 mm, from 0.01 mm to 2 mm, from 0.01 mm to 1 mm, from 0.01 mm to 0.5 mm, or the like.

Strength and/or stiffness characteristics of the wipe may be dictated at least in part by the characteristics of the middle thermoplastic layer of the present substrate. For example, strength and stiffness of the substrate as a whole may progressively increase as one uses, respectively, fibers, a film, a yarn, a nonwoven (e.g., a bico nonwoven), or a woven structured material for the middle sandwich layer. Such materials are listed generally in order of increasing resiliency, where strength and/or stiffness of the overall substrate increase with increasing resiliency of the middle layer. Of course, thickness of the middle layer will also affect the strength and/or stiffness of the finished substrate. By way of further explanation, at a given thickness, a woven structure for the thermoplastic middle sandwich layer may provide the greatest strength and/or stiffness to the substrate, while a nonwoven thermoplastic middle sandwich layer would typically provide somewhat lower strength and/or stiffness. Use of a yarn, e.g., where multiple fibers are twisted or otherwise arranged together, providing a yarn diameter significantly greater than that of the individual fibers making up the yarn may provide somewhat lower stiffness and strength, and a film or simple deposition of individual, loose fibers onto either of the exterior surface layers to form the thermoplastic middle sandwich layer may provide even lower stiffness and/or strength.

It will be apparent that numerous possible configurations are possible as to the structure of the thermoplastic middle sandwich layer, and that numerous possible methods are possible for providing such (e.g., providing preformed layers, for example, as a film, nonwoven, or woven) that are simply placed between the exterior layers, or by providing one of the exterior surface layers, and then depositing individual loose fibers, yarn or the like onto the interior surface of such exterior layer, followed by positioning the other exterior surface layer there over, after which the 3-layer structure is then subjected to heat and/or pressure, to adhere the layers to one another, and cause the formation of cracks, fissures and the like through the thermoplastic middle sandwich layer, through which a cleaning lotion that eventually becomes loaded into the substrate can pass from one exterior surface layer, through the thermoplastic middle sandwich layer, to the other exterior surface layer. For example, one could provide a nonwoven exterior surface layer of any suitable material (e.g., pulp), which serves as a carrier to lay down loose fibers (or fibers formed into a yarn) of the thermoplastic material onto the pulp or other suitable exterior surface layer. Finally, the opposite exterior surface layer (e.g., another pulp nonwoven layer) may be positioned over the loose fibers or loose yarn, and the 3-layer structure may be processed with appropriate heat and/or pressure to melt soften the thermoplastic middle sandwich layer, as described herein.

Another benefit associated with use of pulp exterior layers is that the resulting substrate exhibits lofted characteristics due to the "fuzzy", loose bulk structure of the nonwoven randomly laid pulp fibers in the exterior layers. When using synthetic exterior layers, it may be desirable to provide the substrate with a lofted structure, so as to increase the bulk and thickness of the substrate, where such lofted characteristics may not otherwise be provided with synthetic exterior layers. Such lofting may be provided through overfeeding one or more of the layers (e.g., exterior layers) into the rollers which heat and press the layered substrate. For example, the feed rate of one or both exterior surface layers may be greater than a pick up rate on the other side of such rollers, which causes the material of the overfed layers to bunch up or create pleats as it enters the rollers (e.g., the heated nip and the opposite roller) where the melt softening of the middle layer occurs. This causes a bunched up, pleated, or similar lofted configuration including air gaps to be locked in to the exterior layer as the middle layer melt softens, and bonds to the exterior overfed layer. Such a lofted configuration gives more cloth-like hand feel characteristics, and may provide "reservoirs" within which the cleaning lotion may be stored. This lofted configuration is durable after dosing and during use, akin to what may be provided with a fuzzy, lofted pulp containing (non-synthetic) layer. Other techniques for providing a lofted layer (e.g., particularly on either or both exterior surface layers) may also be used. For example, a pin roller could be used to pull portions of the exterior surface layer laterally outward from the substrate plane, creating a fuzzy, lofted texture with decreased density and increased volume and thickness to such layer. Various other techniques will be apparent to those of skill in the art, in light of the present disclosure.

Where desired, any synthetic substrate layers or materials could be selected to be biodegradable and/or compostable (e.g., meeting the standard of ASTM D6400 or other applicable standard). Of course, pulp layers easily meet such criteria.

Figure 8:
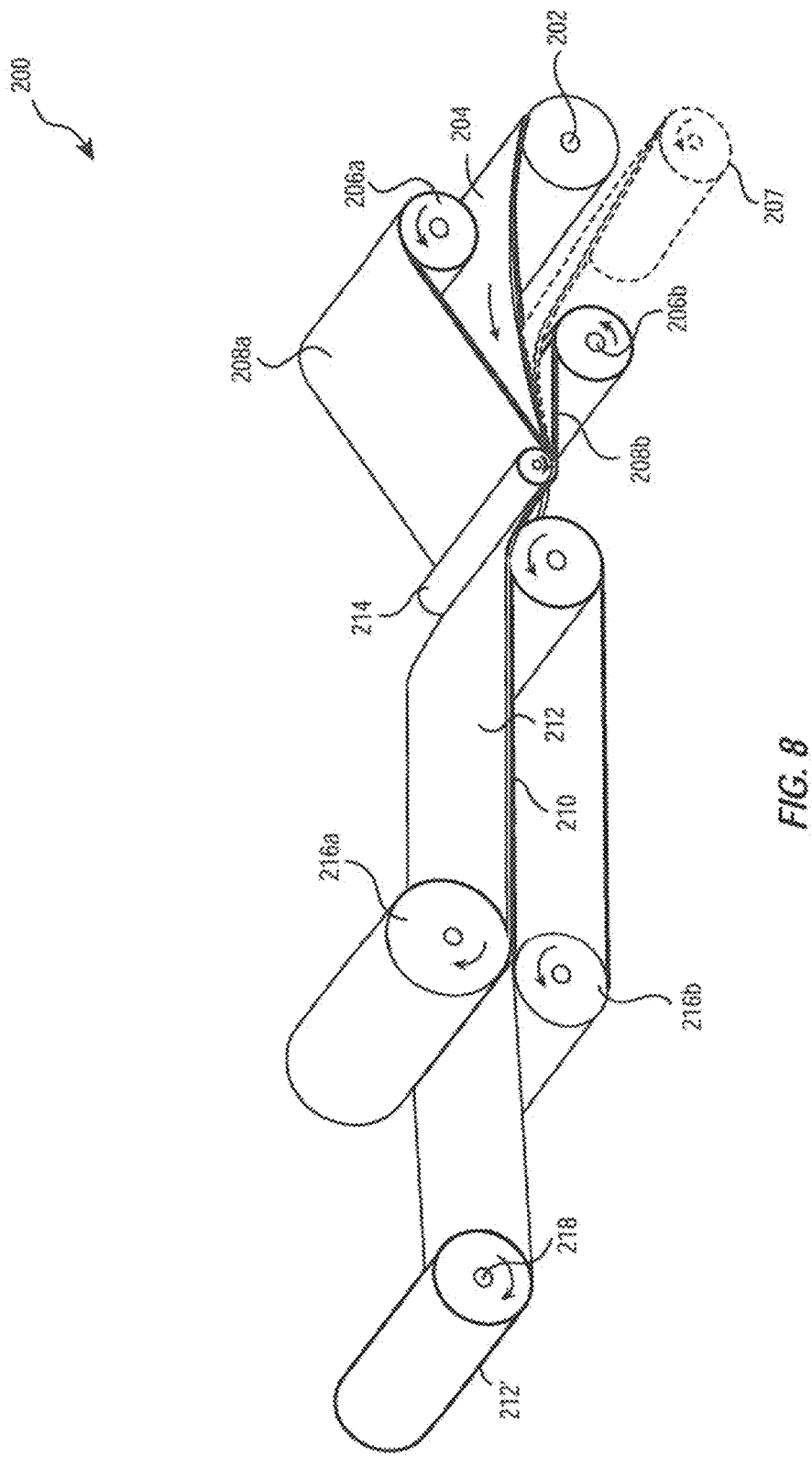
FIG. 8 schematically illustrates an exemplary calendaring process by which the thermoplastic layer having particular tan delta characteristics is melt softened, bonding it to the adjacent exterior surface layers in multi-layer substrates according to the present invention.

FIG. 8 schematically illustrates an exemplary calendaring process 200 that may be used to form the substrates including 3 or more distinctly identifiable layers. FIG. 8 shows use of a rolled web of the 3 starting sheet materials, although it will be appreciated that they could be provided as distinct, separate sheets of material, or that the middle thermoplastic layer could be laid down as loose fibers, before calendaring. Process 200 is shown as including a mechanism 202 for feeding thermoplastic material 204, as well as mechanisms 206a, 206b for providing top and bottom exterior surface layers 208a, 208b. As shown in FIG. 8, the thermoplastic material 204 is sandwiched between exterior surface layers 208a, 208b as it is fed into calendaring portion of process 100, e.g., along an optional conveyor belt 210. A $4^{th}$ optional layer 207 is shown in FIG. 8. For example, if desired, a layer having particular desired characteristics could also be fed into the sandwiching of such layers. Sandwiched structure 212 (thermoplastic material layer 204 between exterior surface layers 208a, 208b) may pass under a roller 214 and then to rollers 216a, 216b. Typically, one of rollers 216a, 216b is rubber, while the other is metal. The rollers may heat the sandwich structure 212 to the desired temperature, for a desired period of time, so as to melt soften the interior layer 204, causing it to bond to the surface exterior layers 208a, 208b.

The pressure applied may be e.g., at about 10 bars, at least about 15 bars, or at least about 25 bars. More generally, such pressure may be less than 300 bars, less than 200 bars, less than 100 bars or less than 50 bars, from 1 to 500 bars, from 5 to 500 bars, from 10 to 300 bars, or from 25 to 200 bars pressure. The thickness and weight of the constituent layers, may have an effect on the required pressure and temperature, and contact time in order to achieve good bonding, as described herein.

After passing through calendaring rollers 216a, 216b, the sandwich structure 212' which is now bonded between the interior layer and the exterior layers passes to take up roller 218.

It will be appreciated that such a process is relatively simple, involving far less capital investment than associated with typical wipe manufacturing operations, which are based on production of such wipe substrates using loose fiber starting materials, and which require use of process water, drying operations to remove such process water, etc. For example, typical processes that incorporate pulp fibers into a wipe substrate are complex processes, involving high capital investment, use of process water to maneuver the fibers either along the plane of the substrate being formed, or through the thickness thereof, subsequent drying to remove such process water, etc. The presently described process is far simpler, in that it uses pulp layers that are already provided in structured form, where the fibers are already fixed relative to the pulp layer, and adhering two such pulp layers so as to form the exterior surface layers, sandwiching therebetween a thermoplastic layer having particular characteristics that permit bonding of the distinct 3 layers without use of any chemical adhesives that would require curing, etc.

While principally described in the context of using rollers to perform the heating and pressing, it will be appreciated that heated plates could alternatively be used (e.g., introducing the sandwich structure between platen plates and pressing the sandwich), although the rollers configuration may be preferred as allowing for far higher production volumes.

d. Cleaning Composition

Many cleaning composition components as known within the art may be suitable for use in the present pre-dosed wipes. In an embodiment, the cleaning composition is an aqueous composition, including at least 70%, at least 80%, or at least 90% water by weight (e.g., 90% to 99% water). The composition may include 0.05% to 5% by weight of a quaternary ammonium compound, and/or 0.1% to 5% by weight of a glycol ether solvent. For example, the quaternary ammonium compound may be included from 0.05%, from 0.1%, up to 5%, up to 4%, up to 3%, up to 2%, or up to 1% by weight of the cleaning composition. The glycol ether solvent may be included from 0.1%, from 0.25%, up to 5%, up to 4%, up to 3%, up to 2%, or up to 1% by weight of the cleaning composition. Other solvents, surfactants, and various other adjuvants often included in cleaning compositions may optionally be present. While some embodiments may include lower alcohol solvents (e.g., $C_1$-$C_4$ alcohols), the amount of such volatile solvents may be limited, e.g., to less than 10%, less than 5%, less than 3%, less than 2%, or less than 1% by weight. In some embodiments, the composition may be free of, or substantially free of, such lower alcohol or other highly volatile solvents.

Quaternary ammonium compounds or other cationic biocides can have broad spectrum antimicrobial properties. A variety of different quaternary ammonium compounds can be used in the cleaning composition. Non-limiting examples of quaternary ammonium compounds are typically halides (e.g., a chloride) of alkyldimethylbenzylammonium, alkyldimethylethylbenzylammonium, alkyldimethylammonium, or the like. The alkyl groups of such quaternary ammonium compounds may typically range from $C_{12}$ to $C_{18}$. Quaternary ammonium compounds are described in more detail in U.S. Pat. No. 6,825,158, incorporated by reference herein, and will already be familiar to those of skill in the art.

Organic acids can also be used to provide antimicrobial properties. By way of example, such an organic acid may be included in an amount of at least 0.1%, or at least 0.5%, up to 5%, up to 4%, up to 3%, up to 2%, or up to 1% by weight of the cleaning composition.

The cleaning composition may include a glycol ether solvent. Exemplary glycol ether solvents include, but are not limited to alkyl ethers of alkylene glycols and alkylene glycol ethers, such as ethylene glycol monopropyl ether, ethylene glycol monobutyl ether, propylene glycol n-propyl ether, propylene glycol monobutyl ether, propylene glycol t-butyl ether, diethylene glycol monoethyl or monopropyl or monobutyl ether, di- or tri-polypropylene glycol methyl or ethyl or propyl or butyl ether, acetate and/or propionate esters of glycol ethers.

Those of skill in the art will appreciate that any among a wide variety of surfactants (e.g., anionic, cationic, non-ionic, zwitterionic, and/or amphoteric) may be included in the cleaning composition, as desired. Where included, a surfactant may be present from 0.05%, from 0.1%, up to 10%, up to 5%, up to 4%, up to 3%, up to 2%, or up to 1% by weight of the cleaning composition. Various surfactants and other optional adjuvants are disclosed in U.S. Pat. No. 3,929,678 to Laughlin and Heuring, U.S. Pat. No. 4,259,217 to Murphy, U.S. Pat. No. 5,776,872 to Giret et al.; U.S. Pat. No. 5,883,059 to Furman et al.; U.S. Pat. No. 5,883,062 to Addison et al.; U.S. Pat. No. 5,906,973 to Ouzounis et al.; U.S. Pat. No. 4,565,647 to Llenado, and U.S. Publication No. 2013/0028990. The above patents and applications are each herein incorporated by reference in their entirety.

As used herein the term "liquid" and "cleaning composition" includes, but is not limited to, solutions, emulsions, suspensions and so forth. Thus, liquids may comprise and/or contain one or more of the following: disinfectants; antiseptics; diluents; surfactants, such as nonionic, anionic, cationic; waxes; antimicrobial agents; sterilants; sporicides; germicides; bactericides; fungicides; virucides; protozoacides; algicides; bacteriostats; fungistats; virustats; sanitizers; antibiotics; pesticides; and so forth. Examples of some such components and exemplary compositions are disclosed in U.S. Pat. Nos. 6,825,158; 8,648,027; 9,006,165; 9,234,165, 9,988,594 and U.S. Publication Nos. 2008/003906 and 2018/0216044, each of which is herein incorporated by reference in its entirety. In some embodiments, it may be possible to provide the substrates in dry form, where dosing with a selected cleaning composition may occur later (e.g., by the user).

With regard to pre-moistened substrates, a selected amount of liquid may be added to the container or wipes during manufacture such that the cleaning substrates contain the desired amount of liquid. The substrates are not necessarily loaded to their saturation point, but are typically loaded with the cleaning composition to some ratio less than full saturation. For example, many substrates are capable of holding about 8 to 14 times their weight in liquid. For various reasons, the substrates may be loaded at a loading ratio less than saturation, e.g., less than 6:1, less than 5:1, less than 4:1, such as from 1:1 to 4:1, from 2:1 to 4:1, from 2.5:1 to 3.5:1, from 2.5:1 to 3:1 or from 2.5:1 to 3.75:1.

Where the substrate may be configured so as to be all synthetic (e.g., without pulp in the exterior surface layers), this may offer additional flexibility in the chemistries that may be dosed (e.g., during manufacture) onto such substrate for use, while minimizing or eliminating risk of undesired incompatibility that may result between components of such compositions and substrates that may include pulp, other natural fibers, or other natural components. By way of non-limiting example, a wide variety of bleaching agents (e.g., chlorine-based and otherwise, including peroxides, hypochlorites, etc.) may be used with such synthetic substrates. Compositions which achieve disinfection based on acids (e.g., acetic acid) may also be used. Such acid disinfectants and bleaches are often incompatible with non-synthetic substrate materials. Non-limiting examples of such compositions are disclosed in U.S. Pat. No. 5,460,833 to Andrews et al.; U.S. Pat. No. 6,221,823 to Crisanti; U.S. Pat. No. 6,346,279 to Rochon et al.; U.S. Pat. No. 6,551,980 to Wisniewski et al.; U.S. Pat. No. 6,699,825 to Rees et al.; U.S. Pat. No. 6,803,057 to Ramirez et al.; U.S. Pat. No. 6,812,196 to Rees et al.; U.S. Pat. No. 6,936,597 to Urban; U.S. Pat. No. 7,008,600 to Katsigras et al.; U.S. Pat. No. 7,070,737 to Bains et al.; U.S. Pat. No. 7,354,604 to Ramirez et al.; U.S. Pat. No. 7,598,214 to Cusack et al.; U.S. Pat. No. 7,605,096 to Tamarchio et al.; U.S. Pat. No. 7,658,953 to Bobbert; U.S. Pat. No. 7,696,143 to McCue et al.; U.S. Pat. No. 7,915,207 to Chopskie et al.; U.S. Pat. No. 8,569,220 to Gaudrealt; U.S. Pat. No. 8,575,084 to Gaudrealt; U.S. Pat. No. 10,064,409 to Hazenkamp et al.; U.S. Pat. No. 10,076,115 to Salminen et al.; U.S. Publication No. 2007/0190172 to Bobbert; PCT Publication Nos. WO 99/18180 to Raso et al.; WO 99/53006 to Masotti et al.; WO 2004/067194 to Arrigoni et al.; WO 2004/104147 to Rosiello et al.; WO 2017/174959 to Convery; and EPO Publication EP 2843034 to Nedic et al.

e. Other Characteristics

The size and shape of the wipe can vary with respect to the intended application and/or end use of the same. The cleaning substrate can have a substantially rectangular shape of a size that allows it to readily engage standard cleaning equipment or tools such as, for example, mop heads, duster heads, brush heads, mitten shaped tools for wiping or cleaning, and so forth. In another embodiment, another shape, e.g., circular, oval, or the like may be provided.

The wipes or other cleaning substrates may be provided pre-moistened with a cleaning composition. The wet cleaning substrates can be maintained over time in a sealable container such as, for example, within a bucket or tub with an attachable lid, sealable plastic pouches or bags, canisters, jars, and so forth. Desirably the wet, stacked cleaning substrates are maintained in a re-sealable container. The use of a re-sealable container is particularly desirable when using aqueous volatile liquid compositions since substantial amounts of liquid can evaporate while using the first sheets thereby leaving the remaining sheets with little or no liquid. Exemplary re-sealable containers and dispensers include, but are not limited to, those described in U.S. Pat. No. 4,171,047 to Doyle et al., U.S. Pat. No. 4,353,480 to McFadyen, U.S. Pat. No. 4,778,048 to Kaspar et al., U.S. Pat. No. 4,741,944 to Jackson et al., U.S. Pat. No. 5,595,786 to McBride et al.; the entire contents of each of the aforesaid references are incorporated herein by reference.

Typically, the cleaning substrates are stacked and placed in the container and the liquid subsequently added thereto, all during mass manufacturing. It is advantageous that the thermoplastic layer at the center of each wipe not be liquid impervious, to facilitate easier loading of the wipes. As described herein, even if the thermoplastic film as initially provided before lamination of the 3 layers together is liquid impervious, Applicant has found that cracks or other fluid pathways are opened up within the film during thermal calendaring, as contemplated herein. While this may not necessarily occur with any and all thermal calendaring operations, it does occur under the conditions contemplated herein.

The presence of such cracks or other fluid pathways that are opened up during manufacture of the multi-layer substrate advantageously allow liquid cleaning composition dosed on either face of the substrate to migrate through the wipe, to the opposite exterior face, through the thermoplastic film layer. This similarly allows the dosed cleaning composition to migrate from one substrate to the next, e.g., where the substrates are stacked (e.g., by wicking the liquid from one to the next). For example, a given volume or weight of the cleaning composition may simply be dosed into the bottom of the container, allowing it to wick into the stack of wipes. In the case of a donut configuration, by placing the cleaning composition into the bottom of the cylindrical container, an end of each wipe actually make simultaneous contact with the cleaning composition in the bottom of the container, where it can be wicked up into the height of each wipe (and the height of the donut). This may actually occur with a donut configuration whether the thermoplastic film layer were "broken" to include the described fluid pathways or not (i.e., if it remained impervious), as both the top and bottom surface layers will contact the cleaning composition at the bottom of the container simultaneously. Where any initially liquid impervious characteristics of the film are "broken" by the thermal calendaring process, this may further aid the cleaning composition in wicking upwards throughout the full height of each wipe, and the donut as a whole.

No matter the packaging and dosing process, once manufactured and packaged, the substrate can subsequently be used to wipe a surface. The moistened cleaning substrates can be used to treat various surfaces. As used herein "treating" surfaces is used in the broad sense and includes, but is not limited to, wiping, polishing, swabbing, cleaning, washing, disinfecting, scrubbing, scouring, sanitizing, and/or applying active agents thereto.

The wipes or other cleaning substrates of the present invention can be provided in a kit form, wherein a plurality of cleaning substrates and a cleaning tool are provided in a single package.

In addition to material composition and construction (e.g., tissue substrates on the exterior, thermoplastic layer having particular tan delta characteristics only on the inside, not on the exposed face, composition of the cleaning "lotion" and the like), wipe or other substrate dimensions can also be used to control dosing as well as provide ergonomic appeal. In one embodiment, substrate dimensions are from about 5½ inches to about 11 inches in length, and from about 5½ inches to about 11 inches in width to comfortably fit in a hand. The substrate can have dimensions such that the length and width differ by no more than about 2 inches. Larger substrates may be provided that can be used and then folded, either once or twice, so as to contain dirt within the inside of the fold and then the wipe can be re-used. Such larger substrates may have a length from about 5½ inches to about 13 inches and a width from about 10 inches to about 13 inches. Such substrates can be folded once or twice and still fit comfortably in the hand.

While most synthetic or blended nonwoven substrates used in wipe manufacture exhibit significant differences in tensile strength in the machine direction (MD) versus the cross direction (CD), the present multi-layer substrates may exhibit values in each direction that result in a ratio of MD/CD that is relatively close to 1, e.g., such as 0.5 to 1.5, 0.75 to 1.25, or 0.8 to 1.2. In other words, the substrates may be substantially isotropic with respect to their tensile strength. Such substantially isotropic characteristics reduce the likelihood of there being problems when folding substrates into stacks for packaging, or forming donuts for packaging.

Various other characteristics relating to stiffness, strength, density of pulp fibers, wet bulk factor, profile height, pore volume distribution characteristics, retention characteristics, lotion retention, MABDF, and others that may be provided by the present wipes are described in Applicant's application Ser. No. 16/042,690, filed Jul. 23, 2018 (Docket No. 510.174), already incorporated herein by reference.

f. Antimicrobial Efficacy & Other Characteristics

Exemplary multi-layer substrates were tested for their ability to effectively deliver an antimicrobial quaternary ammonium compound to a surface during simulated cleaning. Applicant notes that the generally anionic characteristics of typical pulp substrates lead to a tendency of the substrate to bind or otherwise retain the cationic quaternary ammonium compound, even when squeezing an aqueous cleaning composition including such a quat from the substrate. In other words, typically, the concentration of quaternary ammonium compound in the "squeezate" (the cleaning composition as squeezed from the pre-loaded wipe) is less than the concentration of quaternary ammonium compound in the cleaning composition before it was loaded into the wipe. Since quaternary ammonium compounds are known to bind to pulp substrates, it was unexpected that the present wipes were able to release a significant enough portion of the quaternary ammonium compound to achieve disinfectancy and/or sanitization on a treated surface without the inclusion of any biocide release agent or latex binder in the substrate. Even more surprising was that even though the tested substrate was comprised of 78% pulp fibers by weight, when compared to a blended substrate including 60% pulp fiber by weight, the present substrates exhibited greater quat release in the "squeezate" as compared to the comparative wipe, which included lower pulp content.

Because of these interesting and advantageous characteristics, there may not be a need to increase the quat concentration in the cleaning composition, in order to achieve a desired level of microefficacy, as compared to that used in the comparative wipe. For example, commercially available disinfecting wipes often contain about 0.1 to 5%, and preferably 0.1 to 3%, and more preferably 0.1 to 2% by weight of quat in the cleaning composition. Surprisingly, despite the fact that the multi-layer substrates of the present invention have higher levels of pulp they also have good microefficacy performance with 0.1 to 3%, and preferably 0.1 to 2% by weight of quat in the cleaning composition. By way of example, the multi-layer substrates of the present invention may be loaded with cleaning compositions including from 0.1% to 3%, such as 0.1% to 2% by weight of quat. In an embodiment, the wipes may release at least 40%, at least 50%, at least 55%, at least 60%, or at least 65% of the quaternary ammonium compound (i.e., quaternary ammonium compound in the squeezate as compared to the cleaning composition before loading). The wipes may exhibit at least a 3-log reduction in a target microbe, such as *Staphylococcus aureus*, within a given time frame (e.g., such as 5 minutes, 4 minutes, 3 minutes, 1 minute, 30 seconds, 10 seconds, etc.).

Table 1 shows the results of testing in which a cleaning composition including a quaternary ammonium compound was loaded into a substrate according to the present invention, and as compared to a conventional blended substrate. The cleaning composition was squeezed from both substrates, and the squeezate was analyzed to determine the reduction in the concentration of the quaternary ammonium compound in the squeezate compared to the composition as loaded.

TABLE

| Substrate | % Quat Released |
| --- | --- |
| 60/40 blended substrate - comparative example | 51% |
| 78/22 exemplary multi-layer substrate | 69% |

The ability to achieve higher quat release while including higher pulp content is particularly surprising and unexpected. This characteristic advantageously allows for better relative microefficacy characteristics. This high quat release may be due to the presence of absorptive pockets or gaps, e.g., such as seen in FIG. 3, adjacent the unbonded regions. Such gaps provide a significant absorptive region between the thermoplastic film layer and the unbonded raised region 102, which can serve as a reservoir for the cleaning composition. Such regions allow significant quantities of the cleaning composition to be stored within the substrate, to be released upon squeezing, wiping, or other compression, where there is reduced contact between the quat in the composition and any anionic binding sites associated with the pulp fibers of the exterior surface layer. This combination of the reservoirs being partially bounded by the inert thermoplastic film material (which does not include significant concentration of anionic binding sites), in combination with the gaps associated with the reservoirs themselves is believed to at least partially account for the ability to release such high fractions of the quat upon squeezing the wipe.

Other characteristics of the comparative and exemplary substrates are shown in Table 2 below.

TABLE 2

| Characteristic | 60/40 blended substrate - comparative example | 78/22 exemplary multi-layer substrate |
| --- | --- | --- |
| Basis weight | 52 gsm | 55 gsm (26 lb tissue layers + 12 gsm thermoplastic layer |
| Composition (%pulp/%synthetic) | 60/40 | 78/22 |
| Caliper (wet - mm) | 0.6 | 0.76 |
| Absorbency (g) | 12 | 12 |
| Tensile Strength (MD/CD - $lb_f$) | 4.61/1.63 | 3.48/3.06 |
| Dry Stiffness (mg cm) | 285 | 500 |
| Carrier release total - $S_1/S_2$ (g) | 0.49/0.63 | 0.58/0.56 |

By way of further explanation the dot patterns and textures shown in FIG. 1E included smallest dots (100b), small dots (100c), medium dots (100a), and large dots (100d). The wet thickness of the resulting substrates is affected by the dot pattern or texture. For example, a flat sample (not shown) had a wet thickness of 0.3 mm, the sample 100a (smallest dots) had a wet thickness of 0.39 mm, the sample 100b (small dots) had a wet thickness of 0.65 mm, the sample 100c (medium dots) had a wet thickness of 0.66 mm, and sample 100d (large dots) had a wet thickness of 0.83 mm. The forgoing values are for substrates with only one tissue layer textured. Two sided samples include somewhat higher wet thickness values.

The dosed exemplary multi-layer substrate was tested for microefficacy against Staphylococcus aureus at a loading ratio of 3.75:1, using an existing quat cleaning composition, at a contact time of 3 min 30 sec. The control population of 6.1 log was reduced to 0 in each of 60 replicates. Testing was performed under 5% soil load conditions. Such results indicated excellent efficacy against Staphylococcus aureus at a 3:30 contact time.

The dosed wipes were also tested for efficacy in various other household cleaning tasks, including cleaning kitchen grease (KG) and bathroom scum (BS). The results of such testing demonstrated parity or near parity with the comparative wipe, as shown below in Table 3.

TABLE 3

| Substrate | % soil removal at 30 cycles - KG | % soil removal at 30 cycles - BS | Cycles to 75% removal - KG | Cycles to 75% removal - BS |
| --- | --- | --- | --- | --- |
| 60/40 blended substrate - comparative example | 96.87 | 96.62 | 4 | 7 |
| 78/22 exemplary multi-layer substrate | 97.92 | 96.2 | 6 | 9 |

The small increase in cycles for 75% removal may be due to the absence of synthetic fibers on the exterior surface and reduced tendency of the present wipes to "dump" cleaning composition, as compared to the comparative example blended wipe. The reported values represent averages for two sides of the wipes. The conventional wipe "dumps" or releases more liquid from the first side, thereby requiring few cycles to clean, but also reducing mileage. This "dumping" characteristic is described in Applicant's application Ser. No. 16/042,690, filed Jul. 23, 2018 (Docket No. 510.174), previously incorporated by reference.

As mentioned, the present wipes do not include any synthetic fibers exposed at the exterior faces of the wipe, but any synthetic fibers are rather located only within the interior of the wipe (and potentially incidentally exposed at the edges). As a result, the exterior surface may be soft, rather than abrasive. While Applicant did prepare some prototype substrates that did include synthetic fibers on the exterior surfaces (i.e., using a blend of pulp and synthetic fibers to form the exterior "tissue layers", the resulting wipes did not provide the same desired hand-feel characteristics as were provided where the exterior pulp fiber or tissue layers did not include exposed synthetic fibers. While 100% pulp fibers on the exterior faces may thus be preferred, it will be appreciated that some small fraction of synthetic fibers (e.g., less than 10%, less than 5%, less than 3%, or less than 1%) may be included in some embodiments.

The exterior tissue layers may be of a through-air dried configuration. While conventional press-dried tissue was also tried in this exterior layer, this also resulted in less desirable hand-feel characteristics. Such conventional (not through-air-dried) tissue also undesirably presses out any initially included texture, while through-air-dried processing preserves such pre-existing texture. While these alternatives may not be preferred, they may still be suitable, for some uses. Various other possible tissue or nonwoven manufacturing techniques (e.g., dry crepe technique (DCT), structured tissue or new tissue technology (NTT), and others that will be apparent to those of skill in the art) may also be suitable in at least some embodiments.

While use of polyethylene or another thermoplastic polymer having the described tan delta characteristics eliminates any need for a chemical adhesive to adhere the top and bottom surface layer to the thermoplastic layer, it will be appreciated that in other embodiments, e.g., even using polypropylene or another material having poor tan delta characteristics, it may be possible to achieve a multi-layer substrate that does not delaminate, e.g., by using a chemical adhesive to provide the needed bonding.

The degree of lamination and strength of the bond between adjacent layers typically depends on the temperature, pressing or contact time, and applied pressure associated with the calendaring operation. Temperature may be a primary variable responsible for bond strength achieved, although pressure and time may also have an effect, and may also affect the resulting texture that is "embossed" into the pulp fiber surface layer, and the resulting bond pattern. Where the pulp fiber or other layers provided on both exterior faces are embossed with a texture, the resulting multi-layer substrate exhibits a more "cloth-like" feel that is drapable and less stiff, as compared to where only one of the two faces is embossed with a texture. In addition, it was observed that all else being equal, heavier exterior layers (i.e., greater lb or gsm weight) produces a stiffer substrate. FIGS. 7A-7F illustrate various possible embossing patterns that can be applied by the calendar rollers. It will be apparent that the possibilities are nearly limitless.

Temperatures applied during calendaring may be at least 150° F., at least 175° F., at least 200° F., from 200° F. to 400° F., or from 200° F. to 350° F. Applied pressure may be at least 50 psi, at least 100 psi, at least 150 psi, at least 200 psi, from 100 psi to 1000 psi, or from 300 psi to 600 psi. Contact time (time at the given pressure and/or temperature) may be at least 100 ms, at least 200 ms, from 100 ms to 5 s, from 200 ms to 1 s, or from 200 ms to 500 ms.

Such a manufacturing process may be attractive, e.g., as compared to traditional non-woven substrate manufacture, as it may not require any processing of individual fibers not already provided in a nonwoven layer, water usage, water filtration, drying steps, loss of fibers during processing, and the like. In addition, the present calendaring process may allow for greater production line speeds (e.g., up to 900 m/min, typically from 50 m/min to 600 m/min) as compared to SPINLACE manufacturing conventional blended substrates (that are not multi-layer), which are at significantly lower line production speeds.

Increased line speed results in decreased contact time (all else being equal). To provide the desired good bonding, higher line speed may be accommodated by increasing web surface temperature (so shorter contact time is needed), increasing the roller diameter (thus increasing contact time), or increasing applied pressure (nip pressure). By way of example, for every 25 m/min increase in line speed, temperature can be increased by about 5% (in ° C.) to maintain bonding level).

With respect to embossed textures, it was observed that "pin" textures (e.g., associated with fine dots) can result in tearing of the top and bottom surface layers, as the fibers get caught on the pins. Thus, textures that are formed using more of a "flat bar" type contact versus a sharp "pin" may be preferred; as such larger features do not result in such tearing. In addition, it was observed that when manufacturing such substrates through a calendaring operation, that the thermoplastic "cheese" layer should be narrower in width than the top and bottom surface "bread" layers in order to further minimize complications during manufacture. From such a processed multi-layer laminated web, individual sized wipes may be cut to the desired size. Edges of the web that may not include the thermoplastic "cheese" layer could be cut away during such cutting, if desired. The present substrates also provide for the ability to modulate the substrate stiffness by changing the pattern applied during calendaring (e.g., see the various patterns of FIG. 1E or 7A-7F), as well as the ability to modulate stiffness and tensile strength characteristics by providing texturing on one or both of the substrate faces, the ability to provide for relatively higher quat release even at higher pulp fractions, and more uniform lotion release, with better mileage, as described in Applicant's application Ser. No. 16/042,690, filed Jul. 23, 2018 (Docket No. 510.174), due to the high pulp content.

Table 4 below shows the results of additional testing conducted on exemplary formed multi-layer wipes including exterior pulp layers and an interior thermoplastic layer, relative to dry stiffness characteristics. As described in Applicant's application Ser. No. 16/042,690, filed Jul. 23, 2018 (Docket No. 510.174), the stiffness characteristics of wipes that are formed to include exterior pulp layers exhibit significantly higher stiffness than conventional, currently available wipes, even those that are blended substrates, which may include, e.g., up to 60% pulp fibers.

TABLE 4

|  | Exemplary substrate with Hex texture (Trial 1) | Exemplary substrate (no texture) | Exemplary substrate (large dot texture) | Comparative Example 1 | Comparative Example 2 | Comparative Example 3 | Comparative Example 4 |
| --- | --- | --- | --- | --- | --- | --- | --- |
| Composition | Tissue - Bico- Tissue | Tissue - Bico- Tissue | Tissue - Bico- Tissue | SB - loose pulp - SB | SMS - loose Pulp | SMS - loose Pulp | 100% PET |
| % Pulp/% Synthetic | 80/20 | 78/22 | 78/22 | 60/40 | 60/40 | 60/40 | 0/100 |
| Basis Weight (gsm) | 58 | 54 | 54 | 52 | 52 | 52 | 52 |
| Dry Stiffness (mgcm) | 1222 | 379 | 868 | 174 | 70 | 86 | 62 |

Stiffness values were measured using ASTM D-1388-96. As shown in Table 4, the exemplary 3-layer substrate materials include approximately at least double the dry stiffness of wipes produced using current wipes technologies. Such increased stiffness is believed to be due at least in part to the use of fixed pulp fibers, where the pulp layers used in forming the substrates are already in structured form (e.g., as nonwoven sheets, similar to a paper towel).

Additional testing was also performed to evaluate cantilever stiffness using standard techniques e.g., where a substrate to be tested is evaluated by placing it between a stationary slide base, under a axially movable slide, and advancing the substrate towards a decline where the stationary slide base drops away from the axially movable slide, at a given angle (e.g., 45°). During the test, the average length of the substrate that is required to cause the cantilevered substrate to bend so as to contact the declined portion of the stationary slide is measured. The stiffer the substrate, the longer the cantilever length that will be needed to cause the substrate to bend, so as to touch the declined surface of the stationary slide. Applicant surprisingly found that cantilever stiffness decreases with increasing bond area, which is surprising as it would be thought that by laminating the 3 layers of the substrate together, that they might act more in unison, as a composite, thicker, substrate. One hypothesis is that as the bond area is reduced by having raised features on the bonding plates or rollers, these features "break" some of the original structure of the tissue and thus lower the stiffness of the overall structure. The results for different bond areas (simply the fraction of surface area of the substrate that is bonded versus unbonded) are shown in Table 5.

TABLE 5

| Bond Area | Avg. Bending Length (mm) |
| --- | --- |
| 65% | 109 |
| 73% | 94 |
| 100% | 83 |

Higher bending length equates to lower stiffness (all else being equal). The data indicates that as bonding area increases, stiffness decreases, and vice-versa.

Figure 9A:
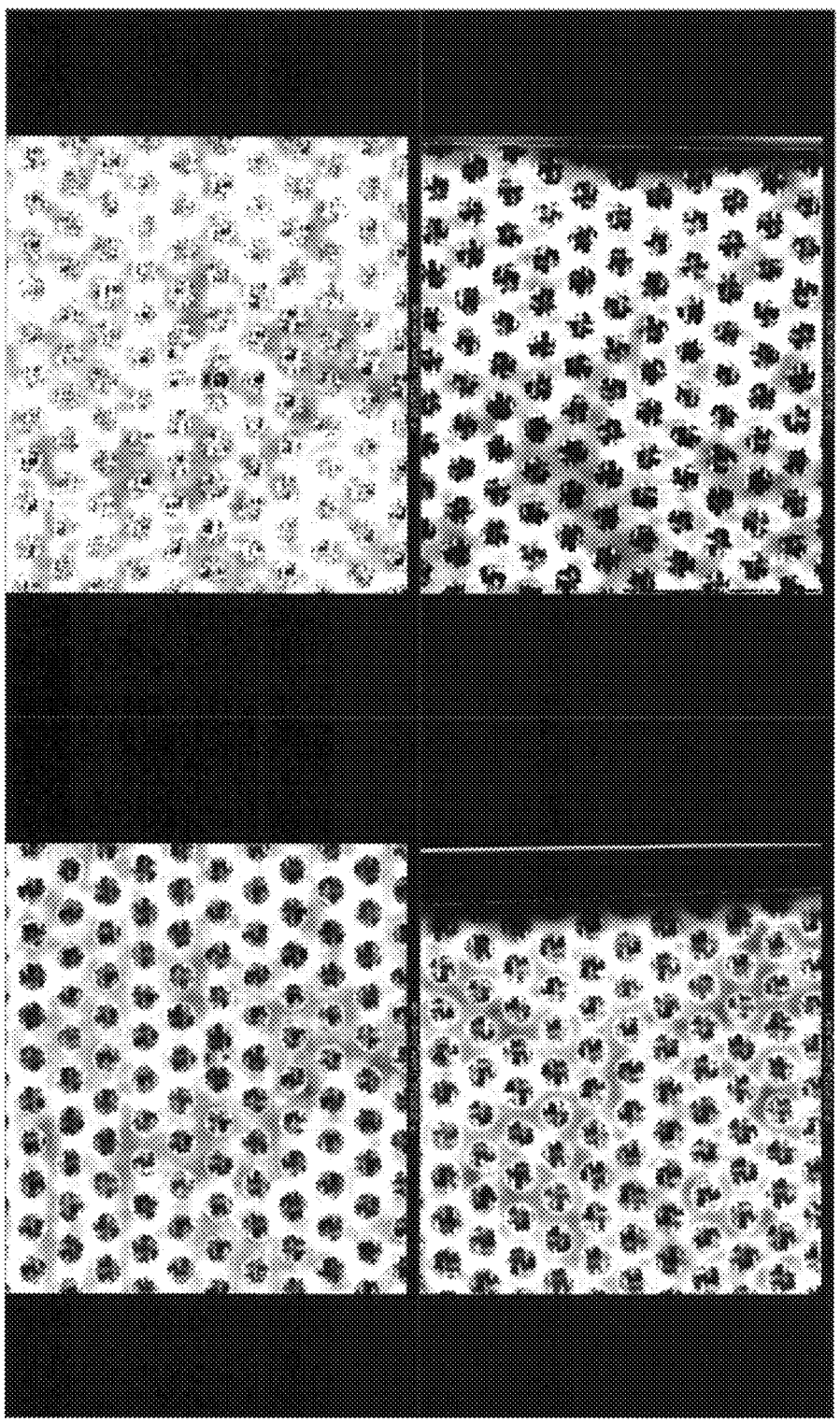
FIG. 9A illustrates images comparing a conventional 1-sided texture (top of FIG. 9A), to a two-sided textured substrate (bottom of FIG. 9A).

In typical calendaring processes, only one of the rollers (e.g., 216a, 216b of FIG. 8) is embossed (e.g., one steel, one rubber or other elastomer). In addition, typical processes result in texture on only one of the two faces of the substrate, where raised texture features on one face are axially aligned with a corresponding depression feature on the opposite face. There are no substrates currently available, which are textured in the same way on both faces, so that raised texture features (bumps) on one face would be axially aligned with corresponding raised texture features (also bumps, not depressions) on the other face. With the presently described processes, it is possible to achieve such two-sided texturing. In an embodiment, two steel rollers (e.g., 216a, 216b) could be used, where both include the texture to be applied to the substrate, which can result in two-sided texturing. FIG. 9A illustrates images comparing a conventional 1-sided texture (top of FIG. 9A), to a two-sided textured substrate, where the "bumps" can be provided in both faces, where the textured "bumps" are axially aligned with one another through the substrate thickness.

Figure 9B:
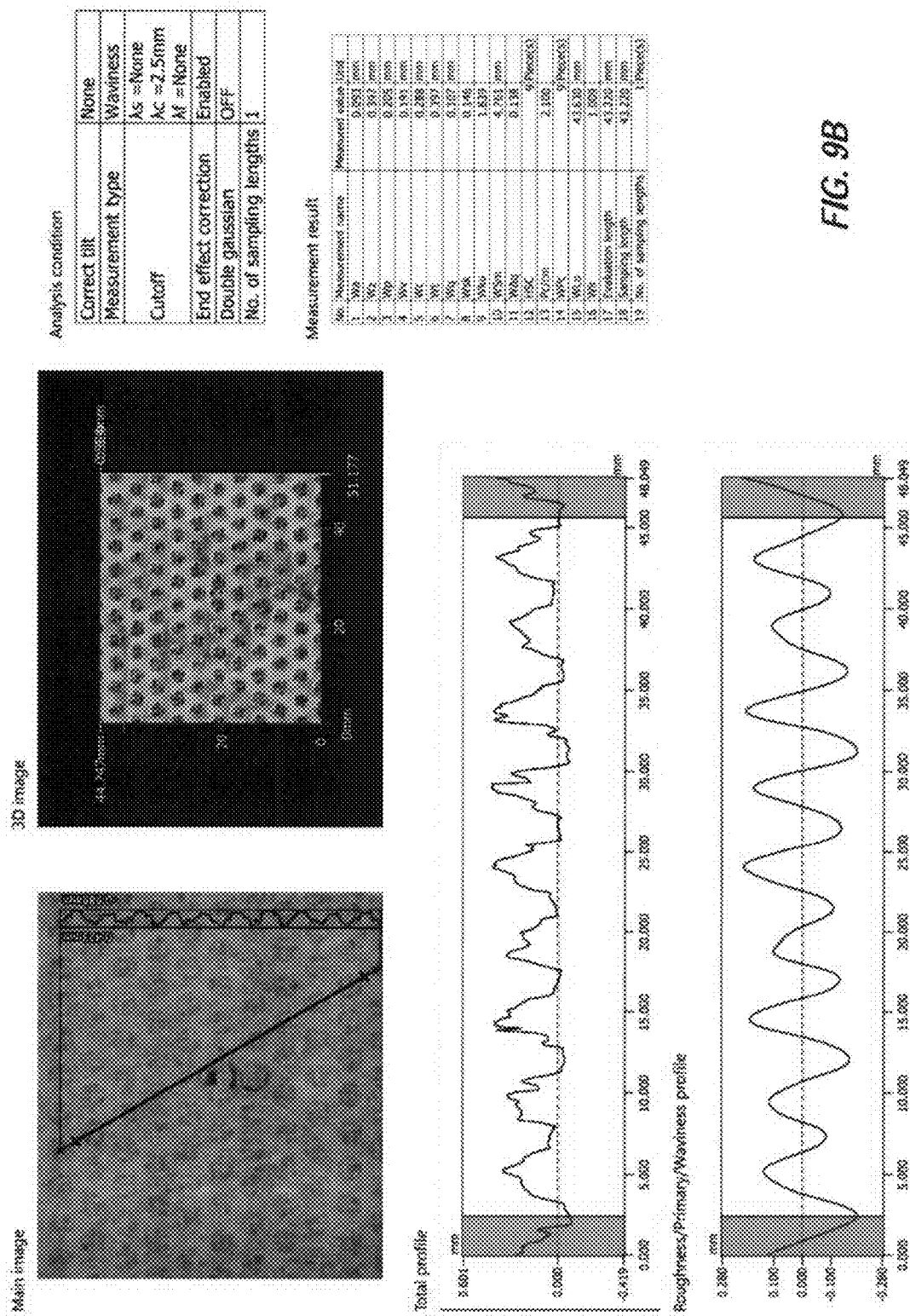
FIGS. 9B-9C illustrate profilometer data for the "bumpy" face and the "other" face of a substrate without two-sided texturing.
Figure 9C:
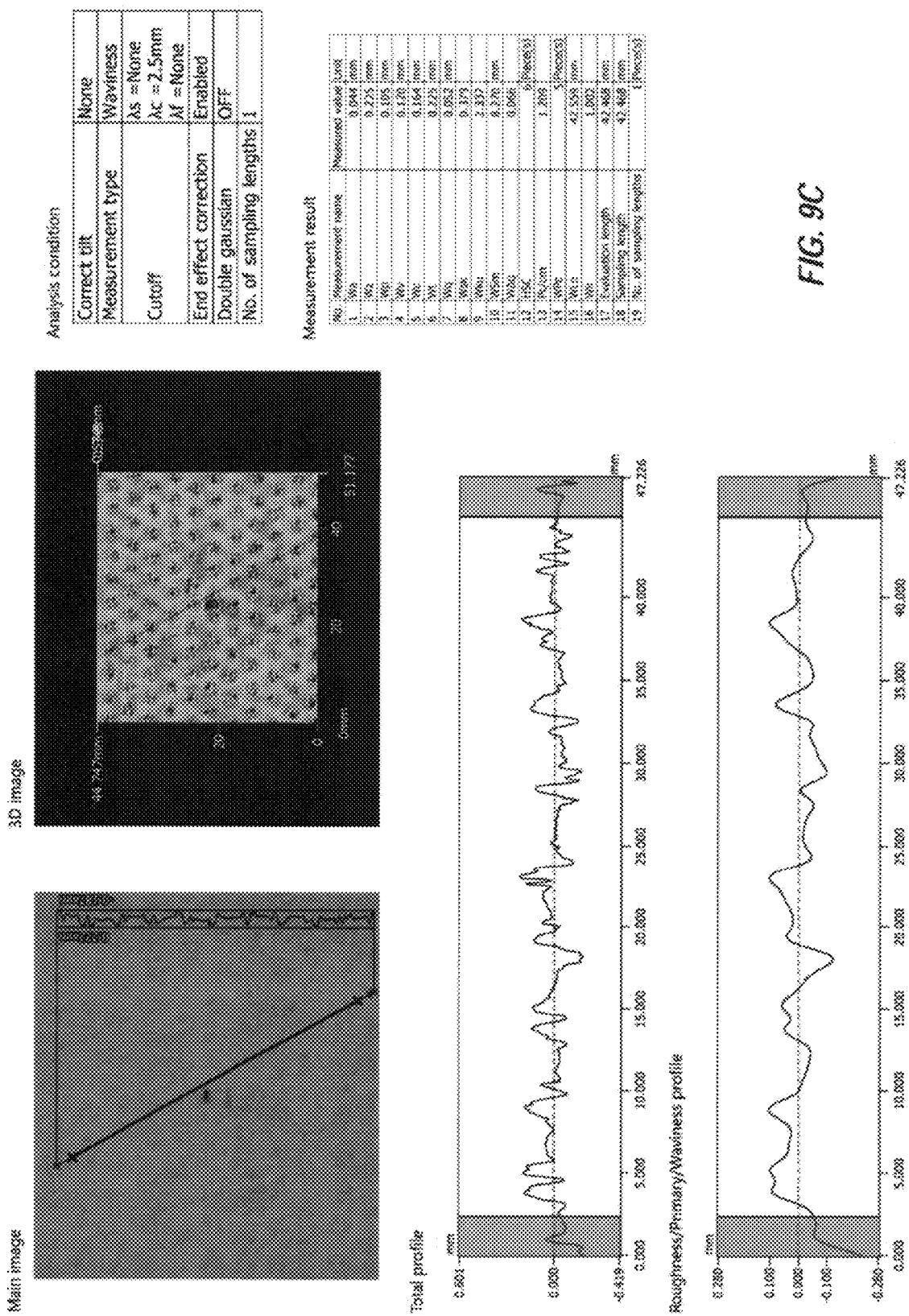
Figure 9D:
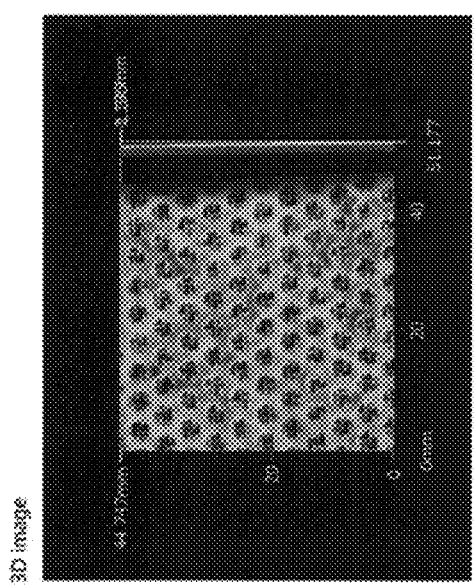
FIGS. 9D-9E illustrate profilometer data for the first and second faces of a substrate with two-sided texturing (both are "bumpy").
Figure 9D:
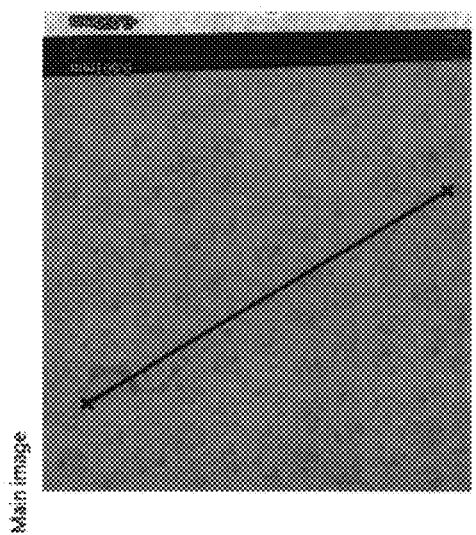
Figure 9D:
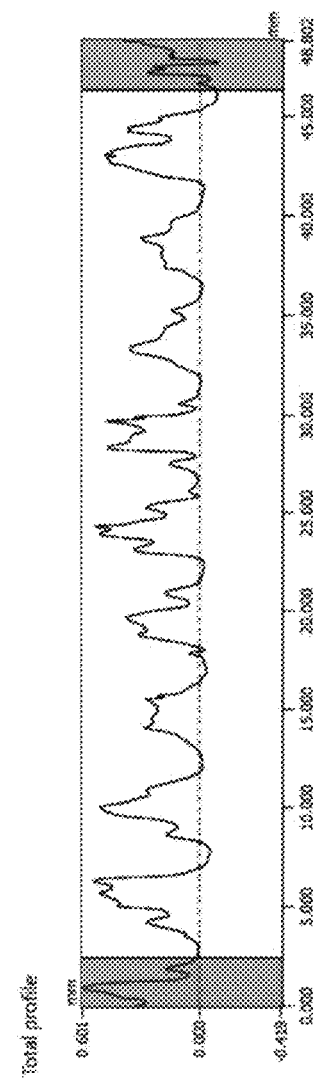
Figure 9D:
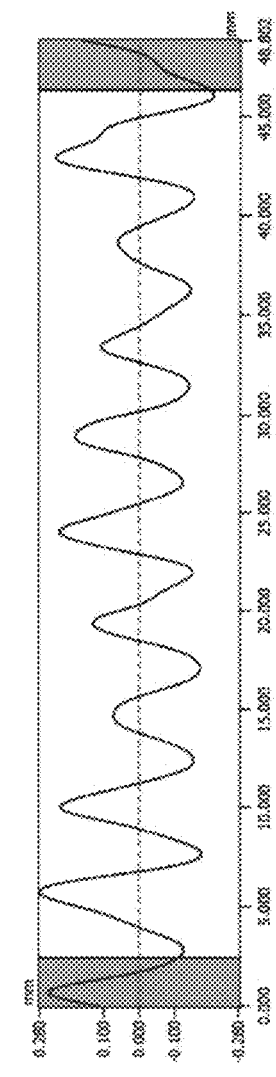
Figure 9E:
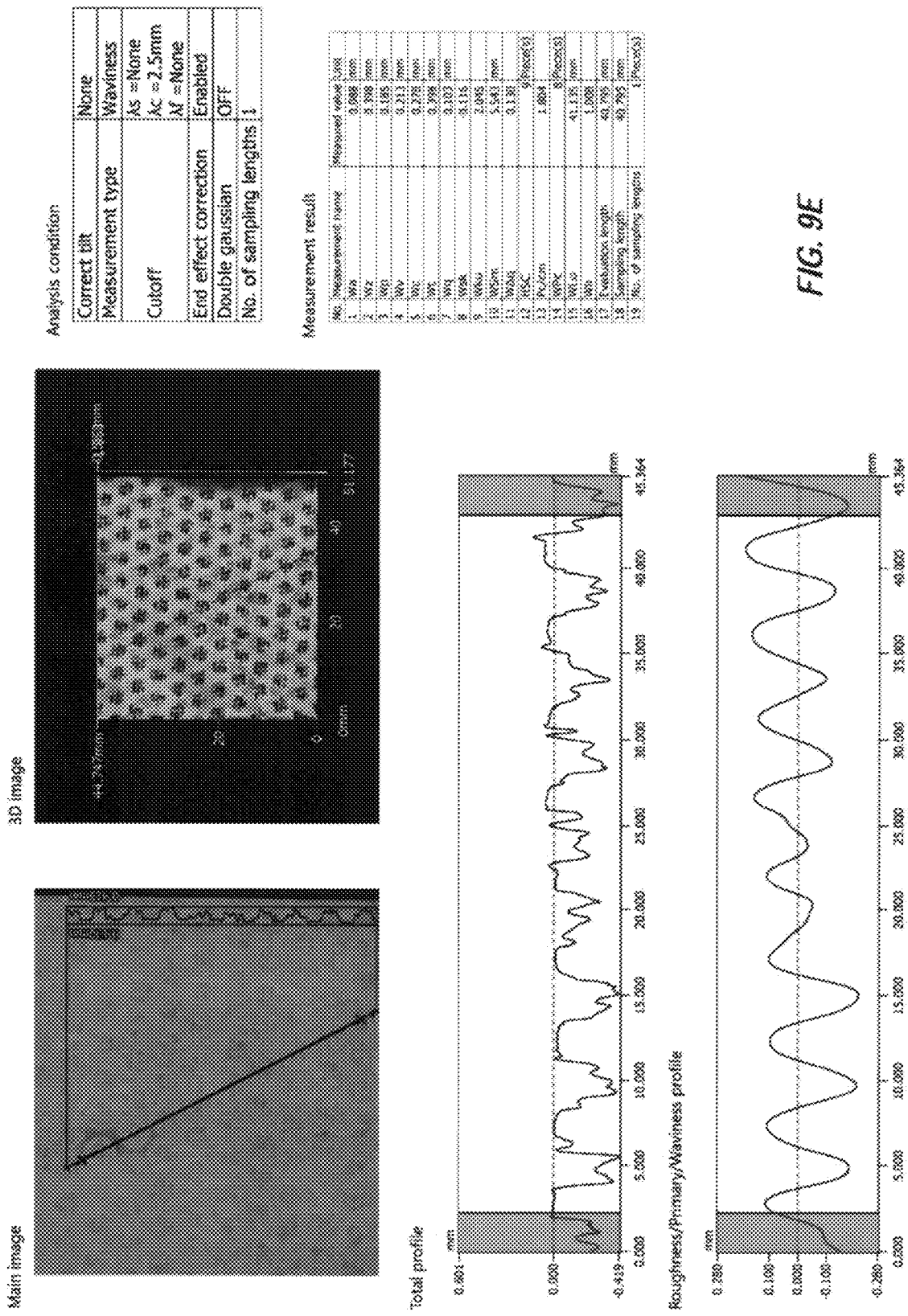
Figure 9F:
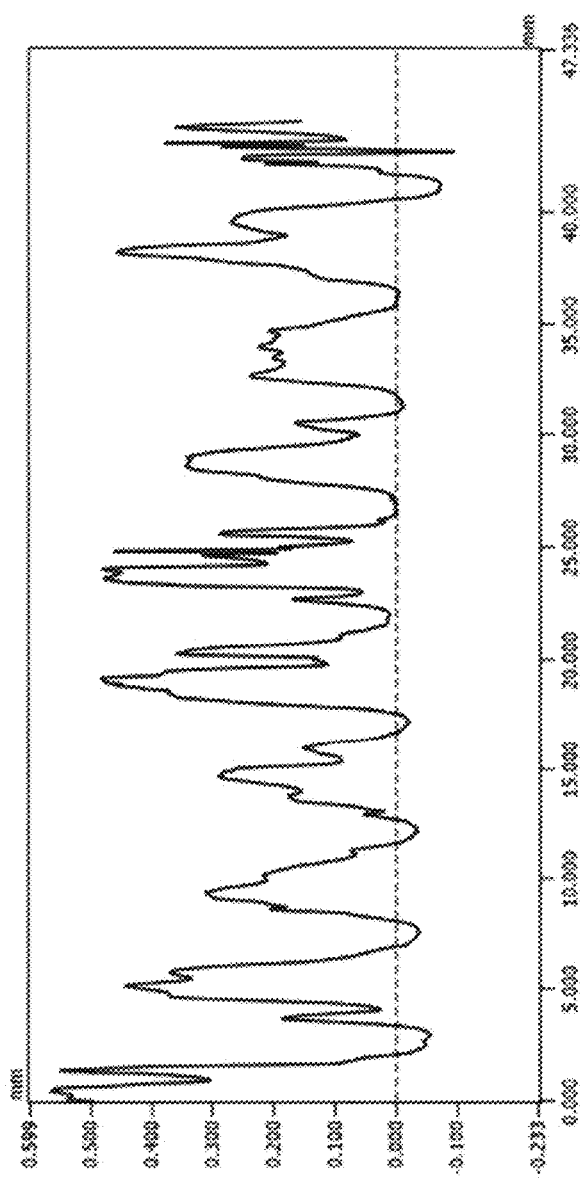
FIGS. 9F-9I illustrate additional profilometer data for the tested comparative one-sided versus two-sided textured samples.
Figure 9G:
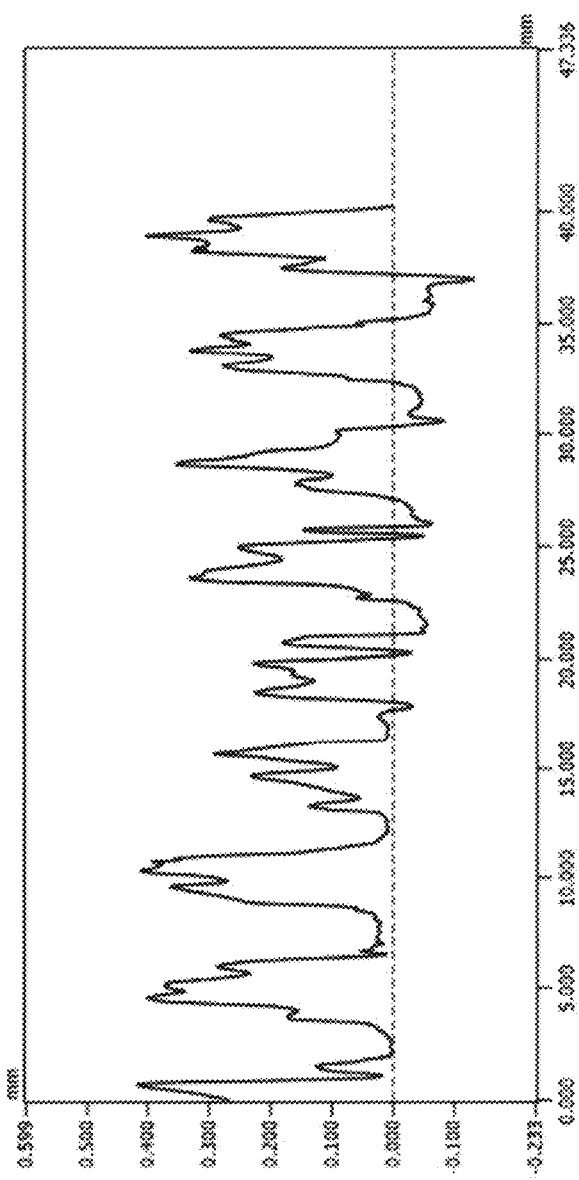
Figure 9H:
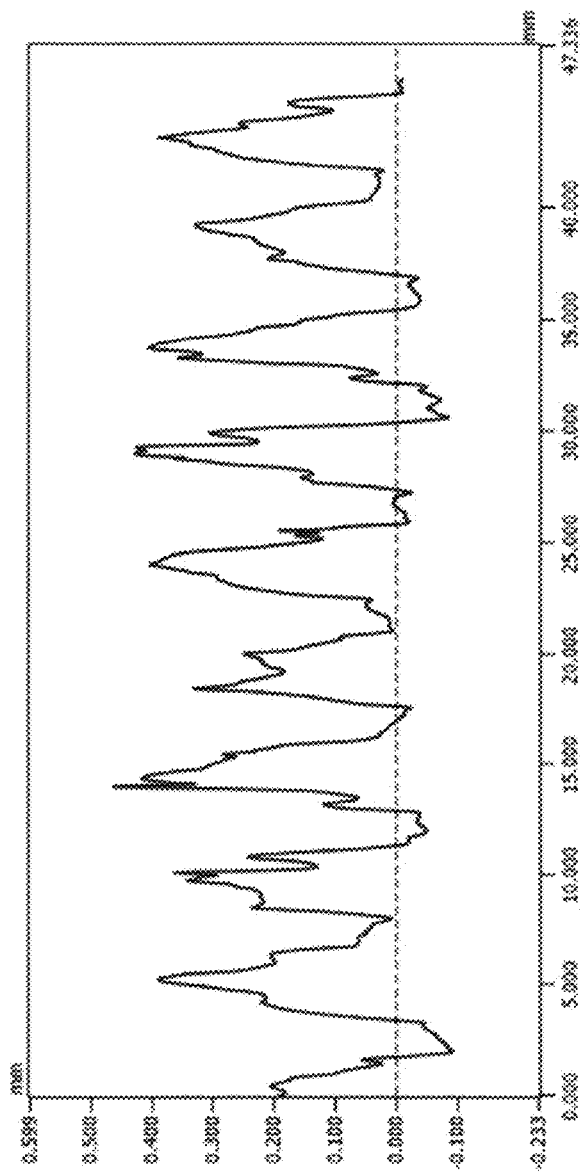
Figure 9I:
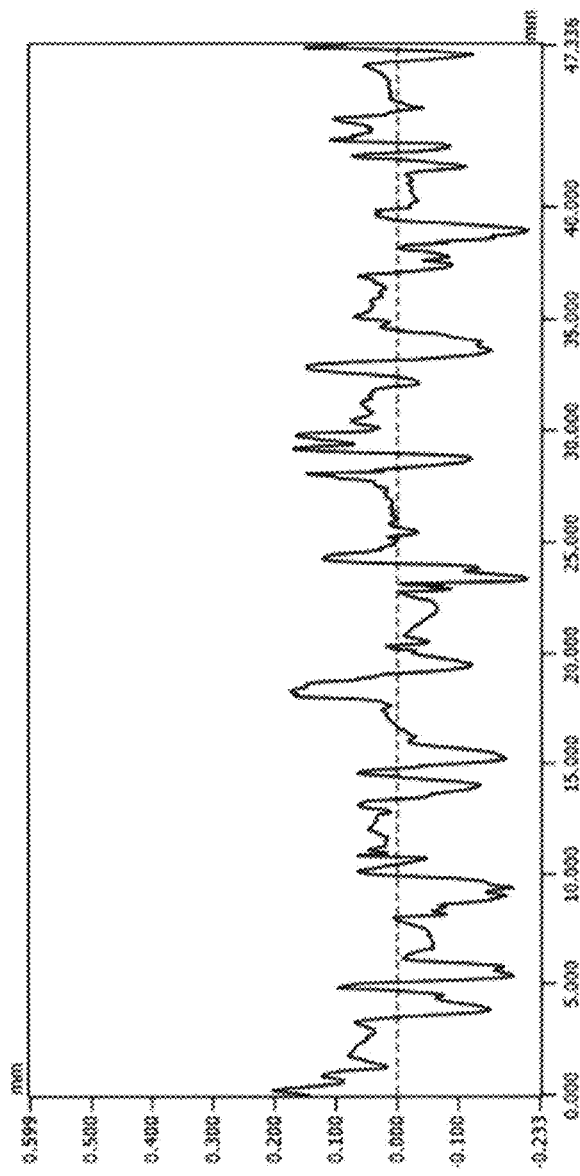

Such may be important in providing a user of the wipe with the same hand feel and other characteristics no matter which face of the wipe is oriented towards the hand, and which face is oriented towards the surface being cleaned (both have the same tactile characteristics, rather than differing from one another). In other words, conventional wipes are not the same on one face as compared to the other, while the present processes can be implemented in a way to provide the same user tactile experience no matter the orientation of the wipe in the user's hands, where two-sided texturing is provided. FIGS. 9B-9C illustrate profilometer data for the "bumpy" face and the "other" face of a substrate without two-sided texturing, while FIGS. 9D-9E illustrate profilometer data for the first and second faces of a substrate with two-sided texturing (both are "bumpy"). FIGS. 9F-9I illustrate additional profilometer data for the tested comparative one-sided versus two-sided textured samples.

Without departing from the spirit and scope of this invention, one of ordinary skill can make various modifications to the invention to adapt it to various usages and conditions. As such, these changes and modifications are properly, equitably, and intended to be, within the full range of equivalence of the following claims.

The invention claimed is:

1. A method for manufacturing a multi-layer substrate comprising:
    (a) providing a top surface layer comprising tissue paper, the tissue paper including fibers;
    (b) providing a bottom surface layer comprising tissue paper, the tissue paper including fibers;
    (c) providing a thermoplastic material that comprises polyethylene or has a tan delta value of 0.2 to 0.4 within the temperature range of 100° F. to 350° F.;
    (d) positioning the thermoplastic material in a position so as to be sandwiched between the top and bottom surface layers, and heating the thermoplastic material to a temperature at which the thermoplastic material softens, with optional application of pressure during heating, so as to bond the thermoplastic material to groups of fibers in the tissue paper layers that are in contact with the thermoplastic material as it softens, such that no chemical adhesives are used to adhere the tissue layers to the thermoplastic material;
    (e) wherein after heat softening, the thermoplastic material includes open pores through the thermoplastic material, providing a fluid pathway therethrough such that any liquid loaded into the top surface layer is able to pass through the fluid pathway, into the bottom surface layer; and
    (f) loading a cleaning composition onto the multi-layer substrate wherein the fluid pathway through the thermoplastic material allows the cleaning composition to travel between the top surface layer and the bottom surface layer.

2. The method of claim 1, wherein pressure is applied with the application of heat during melt softening of the thermoplastic material.

3. The method of claim 1, wherein the thermoplastic material as positioned between the top and bottom surface layers, before heating, is in the form of a sheet that comprises fibers in fixed form, rather than loose fibers.

4. The method of claim 1, wherein the method employs pulp fibers, and any pulp fibers used in the process are in fixed form, as a sheet, rather than being in the form of loose pulp fibers.

5. The method of claim 1, wherein the process does not use process water to maneuver fibers.

6. The method of claim 1, wherein the process does not employ drying to remove any process water.

7. The method of claim 1, wherein the top and bottom surface layers are formed of pulp fibers, which pulp fiber surface layers have been formed by a process selected from the group consisting of: airlaid, wetlaid, carded webs, thermal bonded, through-air bonded, thermoformed, hydroentangled, chemically bonded and combinations.

8. The method of claim 1, wherein the cleaning composition comprises at least 70% water.

9. The method of claim 1, wherein the multi-layer substrate has a basis weight from 30 gsm to 120 gsm.

10. The method of claim 1, wherein the heating and bonding is achieved through a calendaring process, in which the thermoplastic layer sandwiched between the top and bottom surface layers is fed between two rollers of the calendaring process, which heat and press the sandwich structure as it passes through the rollers.

11. The method of claim 10, wherein at least one of the rollers includes an embossing bonding pattern provided therein, which embosses the pattern as a bonded pattern into at least one of the top and bottom surface layers of the sandwich structure, bonding the thermoplastic material to at least one of the top and bottom surface layers in regions corresponding to the embossing bonding pattern.

12. The method of claim 11, wherein the bonding pattern covers at least 50% of the top or bottom surface layer into which the pattern is embossed.

13. The method of claim 11, wherein the process results in a multi-layer substrate that includes:
    (i) unbound regions where the thermoplastic material is not bound to adjacent fibers of the top or bottom surface layer; and
    (ii) bound regions where the thermoplastic material is bound to adjacent fibers of both the top and bottom surface layer.

14. The method of claim 1, wherein the thermoplastic material is a sheet having a thickness from 0.01 mm to 0.05 mm.

15. A method for manufaduring a multi-layer substrate comprising:
    (a) providing a top surface layer in which fibers thereof comprise at least 95% pulp fibers;
    (b) providing a bottom surface layer in which fibers thereof comprise at least 95% pulp fibers;
    (c) providing a thermoplastic material that comprises polyethylene or has a tan delta value of 0.2 to 0.4 within the temperature range of 100° F. to 350° F.;
    (d) positioning the thermoplastic material in a position so as to be sandwiched between the top and bottom surface layers, creating a 3 or more layer sandwich structure, and applying a calendaring process to the 3 or more layer sandwich structure by heating the 3 or more layer sandwich structure to a temperature at which the thermoplastic material softens, while applying, pressure during such heating, so as to bond the thermoplastic material to pulp fibers in the top and bottom surface layers that are in contact with the thermoplastic material as it softens, such that no chemical adhesives are used to adhere the top and bottom surface layers to the thermoplastic material;

(e) wherein after calendaring, the thermoplastic material includes open pores through the thermoplastic material, providing a fluid pathway therethrough such that any liquid loaded into the top surface layer is able to pass through the fluid pathway, into the bottom surface layer; and (f) after calendaring, loading a cleaning composition onto the multi-layer substrate wherein the fluid pathway through the thermoplastic material allows the cleaning composition to travel between the top surface layer and the bottom surface layer.

16. The method of claim 15, wherein the thermoplastic material as positioned between the top and bottom surface layers, before heating, is in the form of a nonwoven sheet that comprises fibers in fixed form, rather than loose fibers.

17. The method of claim 15, wherein all pulp fibers used in the process are in fixed form, as a sheet, rather than being in the form of loose pulp fibers.

18. The method of claim 15, wherein the process does not use process water to maneuver fibers, wherein the process does not employ drying to remove any process water, wherein the process does not use chemical binders to achieve bonding of the layers, wherein the process results in a multi-layer substrate with 3 or more distinct layers, and wherein the process prevents fibers of the sandwich layer from protruding through the top or bottom surface layers, to an exterior face of the multi-layer substrate.

19. The method of claim 15, wherein the multi-layer substrate has a basis weight from 30 gsm to 120 gsm.

\* \* \* \* \*